(12) United States Patent
Blackwell, Jr. et al.

(10) Patent No.: US 9,250,409 B2
(45) Date of Patent: Feb. 2, 2016

(54) FIBER-OPTIC-MODULE TRAYS AND DRAWERS FOR FIBER-OPTIC EQUIPMENT

(75) Inventors: Chois Alven Blackwell, Jr., North Richland Hills, TX (US); Boyd Grant Brower, Keller, TX (US)

(73) Assignee: Corning Cable Systems LLC, Hickory, NC (US)

(*) Notice: Subject to any disclaimer, the term of this patent is extended or adjusted under 35 U.S.C. 154(b) by 237 days.

(21) Appl. No.: 13/539,683

(22) Filed: Jul. 2, 2012

(65) Prior Publication Data

US 2014/0003782 A1 Jan. 2, 2014

(51) Int. Cl.
*G02B 6/00* (2006.01)
*G02B 6/44* (2006.01)

(52) U.S. Cl.
CPC .................................. *G02B 6/4455* (2013.01)

(58) Field of Classification Search
None
See application file for complete search history.

(56) References Cited

U.S. PATENT DOCUMENTS

| | | |
|---|---|---|
| 620,013 A | 2/1899 | Barnes |
| 2,528,910 A | 11/1950 | Poe |
| 2,614,685 A | 10/1952 | Miller |
| 3,081,717 A | 3/1963 | Yurevich |
| 3,175,873 A | 3/1965 | Blomquist et al. |
| 3,212,192 A | 10/1965 | Bachmann et al. |
| 3,433,886 A | 3/1969 | Myers |
| 3,494,306 A | 2/1970 | Aguilar |
| 3,545,712 A | 12/1970 | Ellis |
| 3,568,263 A | 3/1971 | Meehan |
| 3,606,449 A | 9/1971 | Whybrew et al. |
| 3,646,244 A | 2/1972 | Cole |
| 3,701,835 A | 10/1972 | Eisele et al. |
| 3,880,396 A | 4/1975 | Freiberger et al. |
| 3,906,592 A | 9/1975 | Sakasegawa et al. |
| 3,991,960 A | 11/1976 | Tanaka |
| 4,047,797 A | 9/1977 | Arnold et al. |
| 4,059,872 A | 11/1977 | Delesandri |
| 4,119,285 A | 10/1978 | Bisping et al. |
| 4,148,454 A | 4/1979 | Carlson et al. |
| 4,239,316 A | 12/1980 | Spaulding |
| 4,244,638 A | 1/1981 | Little et al. |
| 4,285,486 A | 8/1981 | Von Osten et al. |
| 4,303,296 A | 12/1981 | Spaulding |

(Continued)

FOREIGN PATENT DOCUMENTS

| | | |
|---|---|---|
| AU | 2010270959 A1 | 2/2012 |
| CA | 2029592 A1 | 5/1992 |

(Continued)

OTHER PUBLICATIONS

Patent Cooperation Treaty, International Search Report, Aug. 26, 2013, 3 pages.

(Continued)

*Primary Examiner* — Tina Wong

(57) ABSTRACT

A unitary tray for operably supporting a fiber-optic module is disclosed. The tray includes a guide base and guide rails that define a central channel sized to accommodate the fiber-optic module. The fiber-optic module can be slid into a central module position from the back or the front of the tray, and then locked in the central module position. Opposing unitary side guides with slotted channels can be used to form a drawer that holds one or more of the trays. The drawers can be used to form fiber-optic equipment such as an interconnection unit that supports the modules and that allows for conveniently making multiple optical fiber interconnections.

20 Claims, 16 Drawing Sheets

(56) References Cited

U.S. PATENT DOCUMENTS

| | | |
|---|---|---|
| 4,354,731 A | 10/1982 | Mouissie |
| 4,457,482 A | 7/1984 | Kitagawa |
| 4,525,012 A | 6/1985 | Dunner |
| 4,540,222 A | 9/1985 | Burrell |
| 4,561,615 A | 12/1985 | Medlin, Jr. |
| 4,564,163 A | 1/1986 | Barnett |
| 4,597,173 A | 7/1986 | Chino et al. |
| 4,611,875 A | 9/1986 | Clarke et al. |
| 4,635,886 A | 1/1987 | Santucci et al. |
| 4,645,292 A | 2/1987 | Sammueller |
| 4,657,340 A | 4/1987 | Tanaka et al. |
| 4,681,288 A | 7/1987 | Nakamura |
| 4,702,551 A | 10/1987 | Coulombe |
| 4,711,518 A | 12/1987 | Shank et al. |
| 4,736,100 A | 4/1988 | Vastagh |
| 4,744,629 A | 5/1988 | Bertoglio et al. |
| 4,747,020 A | 5/1988 | Brickley et al. |
| 4,752,110 A | 6/1988 | Blanchet et al. |
| 4,753,510 A | 6/1988 | Sezerman |
| 4,787,706 A | 11/1988 | Cannon, Jr. et al. |
| 4,792,203 A | 12/1988 | Nelson et al. |
| 4,798,432 A | 1/1989 | Becker et al. |
| 4,805,979 A | 2/1989 | Bossard et al. |
| 4,808,774 A | 2/1989 | Crane |
| 4,824,193 A | 4/1989 | Maeda et al. |
| 4,824,196 A | 4/1989 | Bylander |
| 4,826,277 A | 5/1989 | Weber et al. |
| 4,838,643 A | 6/1989 | Hodges et al. |
| 4,840,449 A | 6/1989 | Ghandeharizadeh |
| 4,865,280 A | 9/1989 | Wollar |
| 4,898,448 A | 2/1990 | Cooper |
| 4,900,123 A | 2/1990 | Barlow |
| 4,911,662 A | 3/1990 | Debortoli et al. |
| 4,948,220 A | 8/1990 | Violo et al. |
| 4,949,376 A | 8/1990 | Nieves et al. |
| 4,971,421 A | 11/1990 | Ori |
| 4,986,625 A | 1/1991 | Yamada et al. |
| 4,988,831 A | 1/1991 | Wilson et al. |
| 4,991,928 A | 2/1991 | Zimmer |
| 4,995,688 A | 2/1991 | Anton et al. |
| 5,001,602 A | 3/1991 | Suffi et al. |
| 5,005,941 A | 4/1991 | Barlow et al. |
| 5,017,211 A | 5/1991 | Wenger et al. |
| 5,023,646 A | 6/1991 | Ishida et al. |
| 5,024,498 A | 6/1991 | Becker et al. |
| 5,028,114 A | 7/1991 | Krausse et al. |
| 5,037,175 A | 8/1991 | Weber |
| 5,048,918 A | 9/1991 | Daems et al. |
| 5,060,897 A | 10/1991 | Thalenfeld |
| 5,066,149 A | 11/1991 | Wheeler et al. |
| 5,067,784 A | 11/1991 | Debortoli et al. |
| 5,071,211 A | 12/1991 | Debortoli et al. |
| 5,071,220 A | 12/1991 | Ruello et al. |
| 5,073,042 A | 12/1991 | Mulholland et al. |
| 5,074,635 A | 12/1991 | Justice et al. |
| 5,076,688 A | 12/1991 | Bowen et al. |
| 5,080,459 A | 1/1992 | Wettengel et al. |
| 5,100,221 A | 3/1992 | Carney et al. |
| 5,104,336 A | 4/1992 | Hatanaka et al. |
| 5,123,071 A | 6/1992 | Mulholland et al. |
| 5,125,060 A | 6/1992 | Edmundson |
| 5,127,082 A | 6/1992 | Below et al. |
| 5,127,851 A | 7/1992 | Hilbert et al. |
| 5,129,030 A | 7/1992 | Petrunia |
| 5,129,607 A | 7/1992 | Satoh |
| 5,133,039 A | 7/1992 | Dixit |
| 5,138,678 A | 8/1992 | Briggs et al. |
| 5,138,688 A | 8/1992 | Debortoli |
| 5,142,598 A | 8/1992 | Tabone |
| 5,142,607 A | 8/1992 | Petrotta et al. |
| 5,150,277 A | 9/1992 | Bainbridge et al. |
| D330,368 S | 10/1992 | Bourgeois et al. |
| 5,152,760 A | 10/1992 | Latina |
| 5,153,910 A | 10/1992 | Mickelson et al. |
| 5,157,749 A | 10/1992 | Briggs et al. |
| 5,167,001 A | 11/1992 | Debortoli et al. |
| 5,170,452 A | 12/1992 | Ott |
| 5,189,723 A | 2/1993 | Johnson et al. |
| 5,199,099 A | 3/1993 | Dalgoutte |
| 5,204,929 A | 4/1993 | Machall et al. |
| 5,209,572 A | 5/1993 | Jordan |
| 5,214,735 A | 5/1993 | Henneberger et al. |
| 5,224,186 A | 6/1993 | Kishimoto et al. |
| 5,230,492 A | 7/1993 | Zwart et al. |
| 5,231,687 A | 7/1993 | Handley |
| 5,231,688 A | 7/1993 | Zimmer |
| 5,233,674 A | 8/1993 | Vladic |
| 5,239,609 A | 8/1993 | Auteri |
| 5,243,679 A | 9/1993 | Sharrow et al. |
| 5,253,320 A | 10/1993 | Takahashi et al. |
| 5,260,957 A | 11/1993 | Hakimi et al. |
| 5,261,633 A | 11/1993 | Mastro |
| 5,265,187 A | 11/1993 | Morin et al. |
| 5,274,729 A | 12/1993 | King et al. |
| 5,274,731 A | 12/1993 | White |
| 5,278,933 A | 1/1994 | Hunsinger et al. |
| 5,280,138 A | 1/1994 | Preston et al. |
| 5,285,515 A | 2/1994 | Milanowski et al. |
| 5,291,570 A | 3/1994 | Filgas et al. |
| 5,315,679 A | 5/1994 | Baldwin et al. |
| 5,317,663 A | 5/1994 | Beard et al. |
| 5,323,478 A | 6/1994 | Milanowski et al. |
| 5,323,480 A | 6/1994 | Mullaney et al. |
| 5,329,520 A | 7/1994 | Richardson |
| 5,333,193 A | 7/1994 | Cote et al. |
| 5,333,221 A | 7/1994 | Briggs et al. |
| 5,333,222 A | 7/1994 | Belenkiy et al. |
| 5,337,400 A | 8/1994 | Morin et al. |
| 5,339,379 A | 8/1994 | Kutsch et al. |
| 5,347,603 A | 9/1994 | Belenkiy et al. |
| 5,353,367 A | 10/1994 | Czosnowski et al. |
| 5,359,688 A | 10/1994 | Underwood |
| 5,363,466 A | 11/1994 | Milanowski et al. |
| 5,363,467 A | 11/1994 | Keith |
| 5,366,388 A | 11/1994 | Freeman et al. |
| 5,367,598 A | 11/1994 | Devenish, III et al. |
| 5,373,421 A | 12/1994 | Detsikas et al. |
| 5,383,051 A | 1/1995 | Delrosso et al. |
| 5,390,272 A | 2/1995 | Repta et al. |
| 5,398,295 A | 3/1995 | Chang et al. |
| 5,398,820 A | 3/1995 | Kiss |
| 5,399,814 A | 3/1995 | Staber et al. |
| 5,401,193 A | 3/1995 | Lo Cicero et al. |
| 5,402,515 A | 3/1995 | Vidacovich et al. |
| 5,408,557 A | 4/1995 | Hsu |
| RE34,955 E | 5/1995 | Anton et al. |
| 5,412,751 A | 5/1995 | Siemon et al. |
| 5,416,837 A | 5/1995 | Cote et al. |
| 5,418,874 A | 5/1995 | Carlisle et al. |
| 5,420,956 A | 5/1995 | Grugel et al. |
| 5,420,958 A | 5/1995 | Henson et al. |
| 5,421,532 A | 6/1995 | Richter |
| 5,438,641 A | 8/1995 | Malacarne |
| 5,442,725 A | 8/1995 | Peng |
| 5,442,726 A | 8/1995 | Howard et al. |
| 5,443,232 A | 8/1995 | Kesinger et al. |
| 5,444,804 A | 8/1995 | Yui et al. |
| 5,448,015 A | 9/1995 | Jamet et al. |
| 5,450,518 A | 9/1995 | Burek et al. |
| 5,458,019 A | 10/1995 | Trevino |
| 5,471,555 A | 11/1995 | Braga et al. |
| 5,479,505 A | 12/1995 | Butler et al. |
| 5,481,634 A | 1/1996 | Anderson et al. |
| 5,481,939 A | 1/1996 | Bernardini |
| 5,490,229 A | 2/1996 | Ghandeharizadeh et al. |
| 5,497,416 A | 3/1996 | Butler, III et al. |
| 5,497,444 A | 3/1996 | Wheeler |
| 5,511,144 A | 4/1996 | Hawkins et al. |
| 5,511,798 A | 4/1996 | Kawamoto et al. |
| 5,519,804 A | 5/1996 | Burek et al. |
| 5,530,786 A | 6/1996 | Radliff et al. |
| 5,535,970 A | 7/1996 | Gobbi |
| 5,538,213 A | 7/1996 | Brown |
| 5,542,015 A | 7/1996 | Hultermans |

(56) References Cited

U.S. PATENT DOCUMENTS

| | | |
|---|---|---|
| 5,546,495 A | 8/1996 | Bruckner et al. |
| 5,548,641 A | 8/1996 | Butler et al. |
| 5,553,183 A | 9/1996 | Bechamps |
| 5,553,186 A | 9/1996 | Allen |
| 5,563,971 A | 10/1996 | Abendschein |
| 5,572,617 A | 11/1996 | Bernhardt et al. |
| 5,575,680 A | 11/1996 | Suffi |
| 5,577,151 A | 11/1996 | Hoffer |
| 5,590,234 A | 12/1996 | Pulido |
| 5,595,507 A | 1/1997 | Braun et al. |
| 5,596,670 A | 1/1997 | Debortoli et al. |
| 5,600,020 A | 2/1997 | Wehle et al. |
| 5,602,954 A | 2/1997 | Nolf et al. |
| 5,608,606 A | 3/1997 | Blaney |
| 5,613,030 A | 3/1997 | Hoffer et al. |
| 5,617,501 A | 4/1997 | Miller et al. |
| 5,638,474 A | 6/1997 | Lampert et al. |
| 5,640,476 A | 6/1997 | Womack et al. |
| 5,640,482 A | 6/1997 | Barry et al. |
| 5,647,043 A | 7/1997 | Anderson et al. |
| 5,647,045 A | 7/1997 | Robinson et al. |
| 5,650,334 A | 7/1997 | Zuk et al. |
| 5,668,910 A | 9/1997 | Arnett |
| 5,668,911 A | 9/1997 | Debortoli |
| 5,671,273 A | 9/1997 | Lanquist |
| 5,689,605 A | 11/1997 | Cobb et al. |
| 5,689,606 A | 11/1997 | Hassan |
| 5,689,607 A | 11/1997 | Vincent et al. |
| 5,692,079 A | 11/1997 | Iso |
| 5,694,511 A | 12/1997 | Pimpinella et al. |
| 5,701,380 A | 12/1997 | Larson et al. |
| 5,704,573 A | 1/1998 | de Beers et al. |
| 5,708,742 A | 1/1998 | Beun et al. |
| 5,708,751 A | 1/1998 | Mattei |
| 5,710,851 A | 1/1998 | Walter et al. |
| 5,717,810 A | 2/1998 | Wheeler |
| 5,734,776 A | 3/1998 | Puetz |
| 5,740,300 A | 4/1998 | Hodge |
| 5,742,982 A | 4/1998 | Dodd et al. |
| 5,751,874 A | 5/1998 | Chudoba et al. |
| 5,751,882 A | 5/1998 | Daems et al. |
| 5,754,724 A | 5/1998 | Peterson et al. |
| 5,758,003 A | 5/1998 | Wheeler et al. |
| 5,758,004 A | 5/1998 | Alarcon et al. |
| 5,761,026 A | 6/1998 | Robinson et al. |
| 5,765,698 A | 6/1998 | Bullivant |
| 5,769,908 A | 6/1998 | Koppelman |
| 5,774,612 A | 6/1998 | Belenkiy et al. |
| 5,778,122 A | 7/1998 | Giebel et al. |
| 5,778,130 A | 7/1998 | Walters et al. |
| 5,781,686 A | 7/1998 | Robinson et al. |
| 5,788,087 A | 8/1998 | Orlando |
| 5,790,741 A | 8/1998 | Vincent et al. |
| 5,793,920 A | 8/1998 | Wilkins et al. |
| 5,793,921 A | 8/1998 | Wilkins et al. |
| 5,796,908 A | 8/1998 | Vicory |
| 5,823,646 A | 10/1998 | Arizpe et al. |
| 5,825,955 A | 10/1998 | Ernst et al. |
| 5,825,961 A | 10/1998 | Wilkins et al. |
| 5,828,807 A | 10/1998 | Tucker et al. |
| 5,832,162 A | 11/1998 | Sarbell |
| 5,835,657 A | 11/1998 | Suarez et al. |
| 5,835,658 A | 11/1998 | Smith |
| 5,862,290 A | 1/1999 | Burek et al. |
| 5,870,519 A | 2/1999 | Jenkins et al. |
| 5,874,733 A | 2/1999 | Silver et al. |
| 5,877,565 A | 3/1999 | Hollenbach et al. |
| 5,880,864 A | 3/1999 | Williams et al. |
| 5,881,200 A | 3/1999 | Burt |
| 5,883,995 A | 3/1999 | Lu et al. |
| 5,884,003 A | 3/1999 | Cloud et al. |
| 5,887,095 A | 3/1999 | Nagase et al. |
| 5,887,106 A | 3/1999 | Cheeseman et al. |
| 5,892,877 A | 4/1999 | Meyerhoefer |
| 5,894,540 A | 4/1999 | Drewing |
| 5,901,220 A | 5/1999 | Garver et al. |
| 5,903,693 A | 5/1999 | Brown |
| 5,906,342 A | 5/1999 | Kraus |
| 5,909,298 A | 6/1999 | Shimada et al. |
| 5,913,006 A | 6/1999 | Summach |
| 5,914,976 A | 6/1999 | Jayaraman et al. |
| 5,915,055 A | 6/1999 | Bennett et al. |
| 5,923,804 A | 7/1999 | Rosson |
| 5,930,425 A | 7/1999 | Abel et al. |
| 5,933,557 A | 8/1999 | Ott |
| 5,940,563 A | 8/1999 | Kobayashi et al. |
| 5,943,460 A | 8/1999 | Mead et al. |
| 5,945,633 A | 8/1999 | Ott et al. |
| 5,946,440 A | 8/1999 | Puetz |
| 5,949,946 A | 9/1999 | Debortoli et al. |
| 5,953,962 A | 9/1999 | Hewson |
| 5,956,439 A | 9/1999 | Pimpinella |
| 5,956,444 A | 9/1999 | Duda et al. |
| 5,956,449 A | 9/1999 | Otani et al. |
| 5,966,492 A | 10/1999 | Bechamps et al. |
| 5,969,294 A | 10/1999 | Eberle et al. |
| 5,975,769 A | 11/1999 | Larson et al. |
| 5,978,540 A | 11/1999 | Bechamps et al. |
| 5,980,303 A | 11/1999 | Lee et al. |
| 5,993,071 A | 11/1999 | Hultermans |
| 5,995,700 A | 11/1999 | Burek et al. |
| 5,999,393 A | 12/1999 | Brower |
| 6,001,831 A | 12/1999 | Papenfuhs et al. |
| 6,009,224 A | 12/1999 | Allen |
| 6,009,225 A | 12/1999 | Ray et al. |
| 6,011,831 A | 1/2000 | Nieves et al. |
| 6,027,252 A | 2/2000 | Erdman et al. |
| 6,027,352 A | 2/2000 | Byrne |
| 6,041,042 A | 3/2000 | Bussiere |
| 6,044,193 A | 3/2000 | Szentesi et al. |
| 6,058,235 A | 5/2000 | Hiramatsu et al. |
| 6,061,492 A | 5/2000 | Strause et al. |
| 6,078,661 A | 6/2000 | Arnett et al. |
| 6,079,881 A | 6/2000 | Roth |
| 6,088,497 A | 7/2000 | Phillips et al. |
| 6,118,075 A | 9/2000 | Baker et al. |
| 6,127,627 A | 10/2000 | Daoud |
| 6,130,983 A | 10/2000 | Cheng |
| 6,134,370 A | 10/2000 | Childers et al. |
| 6,149,313 A | 11/2000 | Giebel et al. |
| 6,149,315 A | 11/2000 | Stephenson |
| 6,151,432 A | 11/2000 | Nakajima et al. |
| 6,160,946 A | 12/2000 | Thompson et al. |
| 6,170,784 B1 | 1/2001 | MacDonald et al. |
| 6,172,782 B1 | 1/2001 | Kobayashi |
| 6,175,079 B1 | 1/2001 | Johnston et al. |
| 6,181,861 B1 | 1/2001 | Wenski et al. |
| 6,188,687 B1 | 2/2001 | Mussman et al. |
| 6,188,825 B1 | 2/2001 | Bandy et al. |
| 6,192,180 B1 | 2/2001 | Kim et al. |
| 6,201,920 B1 | 3/2001 | Noble et al. |
| 6,208,796 B1 | 3/2001 | Williams Vigliaturo |
| 6,212,324 B1 | 4/2001 | Lin et al. |
| 6,215,938 B1 | 4/2001 | Reitmeier et al. |
| 6,216,987 B1 | 4/2001 | Fukuo |
| 6,220,762 B1 | 4/2001 | Kanai et al. |
| 6,227,717 B1 | 5/2001 | Ott et al. |
| 6,229,948 B1 | 5/2001 | Blee et al. |
| 6,234,683 B1 | 5/2001 | Waldron et al. |
| 6,234,685 B1 | 5/2001 | Carlisle et al. |
| 6,236,795 B1 | 5/2001 | Rodgers |
| 6,240,229 B1 | 5/2001 | Roth |
| 6,243,522 B1 | 6/2001 | Allan et al. |
| 6,245,998 B1 | 6/2001 | Curry et al. |
| 6,247,851 B1 | 6/2001 | Ichihara |
| 6,259,850 B1 | 7/2001 | Crosby, Jr. et al. |
| 6,263,141 B1 | 7/2001 | Smith |
| 6,265,680 B1 | 7/2001 | Robertson |
| 6,269,212 B1 | 7/2001 | Schiattone |
| 6,273,532 B1 | 8/2001 | Chen et al. |
| 6,275,641 B1 | 8/2001 | Daoud |
| 6,278,829 B1 | 8/2001 | BuAbbud et al. |
| 6,278,831 B1 | 8/2001 | Henderson et al. |
| D448,005 S | 9/2001 | Klein, Jr. et al. |

(56) References Cited

U.S. PATENT DOCUMENTS

| | | |
|---|---|---|
| 6,289,618 B1 | 9/2001 | Kump et al. |
| 6,292,614 B1 | 9/2001 | Smith et al. |
| 6,301,424 B1 | 10/2001 | Hwang |
| 6,305,848 B1 | 10/2001 | Gregory |
| 6,307,997 B1 | 10/2001 | Walters et al. |
| 6,318,824 B1 | 11/2001 | LaGrotta et al. |
| 6,321,017 B1 | 11/2001 | Janus et al. |
| 6,322,279 B1 | 11/2001 | Yamamoto et al. |
| 6,324,575 B1 | 11/2001 | Jain et al. |
| 6,325,549 B1 | 12/2001 | Shevchuk |
| 6,327,059 B1 | 12/2001 | Bhalla et al. |
| RE37,489 E | 1/2002 | Anton et al. |
| 6,343,313 B1 | 1/2002 | Salesky et al. |
| 6,344,615 B1 | 2/2002 | Nolf et al. |
| 6,347,888 B1 | 2/2002 | Puetz |
| 6,353,696 B1 | 3/2002 | Gordon et al. |
| 6,353,697 B1 | 3/2002 | Daoud |
| 6,357,712 B1 | 3/2002 | Lu |
| 6,359,228 B1 | 3/2002 | Strause et al. |
| 6,360,050 B1 | 3/2002 | Moua et al. |
| 6,363,198 B1 | 3/2002 | Braga et al. |
| 6,363,200 B1 | 3/2002 | Thompson et al. |
| 6,370,309 B1 | 4/2002 | Daoud |
| 6,371,419 B1 | 4/2002 | Ohnuki |
| 6,375,129 B2 | 4/2002 | Koziol |
| 6,377,218 B1 | 4/2002 | Nelson et al. |
| 6,379,052 B1 | 4/2002 | De Jong et al. |
| 6,381,642 B1 | 4/2002 | O'Donnell et al. |
| 6,385,374 B2 | 5/2002 | Kropp |
| 6,385,381 B1 | 5/2002 | Janus et al. |
| 6,389,214 B1 | 5/2002 | Smith et al. |
| 6,397,166 B1 | 5/2002 | Leung et al. |
| 6,398,149 B1 | 6/2002 | Hines et al. |
| 6,406,314 B1 | 6/2002 | Byrne |
| 6,411,767 B1 | 6/2002 | Burrous et al. |
| 6,412,986 B1 | 7/2002 | Ngo et al. |
| 6,418,262 B1 | 7/2002 | Puetz et al. |
| 6,419,519 B1 | 7/2002 | Young |
| 6,424,781 B1 | 7/2002 | Puetz et al. |
| 6,425,694 B1 | 7/2002 | Szilagyi et al. |
| 6,427,045 B1 | 7/2002 | Matthes et al. |
| 6,431,762 B1 | 8/2002 | Taira et al. |
| 6,434,313 B1 | 8/2002 | Clapp, Jr. et al. |
| 6,438,310 B1 | 8/2002 | Lance et al. |
| 6,452,925 B1 | 9/2002 | Sistanizadeh et al. |
| 6,456,773 B1 | 9/2002 | Keys |
| 6,464,402 B1 | 10/2002 | Andrews et al. |
| 6,466,724 B1 | 10/2002 | Glover et al. |
| 6,469,905 B1 | 10/2002 | Hwang |
| D466,087 S | 11/2002 | Cuny et al. |
| 6,478,472 B1 | 11/2002 | Anderson et al. |
| 6,480,487 B1 | 11/2002 | Wegleitner et al. |
| 6,480,660 B1 | 11/2002 | Reitmeier et al. |
| 6,483,977 B2 | 11/2002 | Battey et al. |
| 6,484,958 B1 | 11/2002 | Xue et al. |
| 6,494,550 B1 | 12/2002 | Chen et al. |
| 6,496,640 B1 | 12/2002 | Harvey et al. |
| 6,504,988 B1 | 1/2003 | Trebesch et al. |
| 6,507,980 B2 | 1/2003 | Bremicker |
| 6,510,274 B1 | 1/2003 | Wu et al. |
| 6,532,332 B2 | 3/2003 | Solheid et al. |
| 6,533,472 B1 | 3/2003 | Dinh et al. |
| 6,535,397 B2 | 3/2003 | Clark et al. |
| 6,539,147 B1 | 3/2003 | Mahony |
| 6,539,160 B2 | 3/2003 | Battey et al. |
| 6,542,688 B1 | 4/2003 | Battey et al. |
| 6,544,075 B1 | 4/2003 | Liao |
| 6,550,977 B2 | 4/2003 | Hizuka |
| 6,554,485 B1 | 4/2003 | Beatty et al. |
| 6,560,334 B1 | 5/2003 | Mullaney et al. |
| 6,567,601 B2 | 5/2003 | Daoud et al. |
| 6,568,542 B1 | 5/2003 | Chen |
| 6,571,048 B1 | 5/2003 | Bechamps et al. |
| 6,577,595 B1 | 6/2003 | Counterman |
| 6,577,801 B2 | 6/2003 | Broderick et al. |
| 6,579,014 B2 | 6/2003 | Melton et al. |
| 6,584,267 B1 | 6/2003 | Caveney et al. |
| 6,585,423 B1 | 7/2003 | Vergeest |
| 6,587,630 B2 | 7/2003 | Spence et al. |
| 6,588,938 B1 | 7/2003 | Lampert et al. |
| 6,591,051 B2 | 7/2003 | Solheid et al. |
| 6,591,053 B2 | 7/2003 | Fritz |
| 6,592,266 B1 | 7/2003 | Hankins et al. |
| 6,597,670 B1 | 7/2003 | Tweedy et al. |
| 6,600,106 B2 | 7/2003 | Standish et al. |
| 6,600,866 B2 | 7/2003 | Gatica et al. |
| 6,601,997 B2 | 8/2003 | Ngo |
| 6,612,515 B1 | 9/2003 | Tinucci et al. |
| 6,612,874 B1 | 9/2003 | Stout et al. |
| 6,614,978 B1 | 9/2003 | Caveney |
| 6,614,980 B1 | 9/2003 | Mahony |
| 6,621,975 B2 | 9/2003 | Laporte et al. |
| 6,622,873 B2 | 9/2003 | Hegrenes et al. |
| 6,624,389 B1 | 9/2003 | Cox |
| 6,625,374 B2 | 9/2003 | Holman et al. |
| 6,625,375 B1 | 9/2003 | Mahony |
| 6,631,237 B2 | 10/2003 | Knudsen et al. |
| 6,640,042 B2 | 10/2003 | Araki et al. |
| RE38,311 E | 11/2003 | Wheeler |
| 6,644,863 B1 | 11/2003 | Azami et al. |
| 6,647,197 B1 | 11/2003 | Marrs et al. |
| 6,648,520 B2 | 11/2003 | McDonald et al. |
| 6,654,536 B2 | 11/2003 | Battey et al. |
| 6,661,650 B2 | 12/2003 | Nakajima et al. |
| 6,668,127 B1 | 12/2003 | Mahony |
| 6,669,149 B2 | 12/2003 | Akizuki |
| 6,677,520 B1 | 1/2004 | Kim et al. |
| 6,679,604 B1 | 1/2004 | Bove et al. |
| 6,687,450 B1 | 2/2004 | Kempeneers et al. |
| 6,693,552 B1 | 2/2004 | Herzig et al. |
| 6,695,620 B1 | 2/2004 | Huang |
| 6,701,056 B2 | 3/2004 | Burek et al. |
| 6,710,366 B1 | 3/2004 | Lee et al. |
| 6,715,619 B2 | 4/2004 | Kim et al. |
| 6,719,149 B2 | 4/2004 | Tomino |
| 6,721,482 B1 | 4/2004 | Glynn |
| 6,731,851 B2 | 5/2004 | Sato et al. |
| 6,741,784 B1 | 5/2004 | Guan |
| 6,741,785 B2 | 5/2004 | Barthel et al. |
| 6,746,037 B1 | 6/2004 | Kaplenski et al. |
| 6,748,154 B2 | 6/2004 | O'Leary et al. |
| 6,748,155 B2 | 6/2004 | Kim et al. |
| 6,758,600 B2 | 7/2004 | Del Grosso et al. |
| 6,768,860 B2 | 7/2004 | Liberty |
| 6,771,861 B2 | 8/2004 | Wagner et al. |
| 6,773,297 B2 | 8/2004 | Komiya |
| 6,778,525 B1 | 8/2004 | Baum et al. |
| 6,778,752 B2 | 8/2004 | Laporte et al. |
| 6,786,647 B1 | 9/2004 | Hinds et al. |
| 6,786,743 B2 | 9/2004 | Huang |
| 6,786,896 B1 | 9/2004 | Madhani et al. |
| 6,788,871 B2 | 9/2004 | Taylor |
| 6,792,190 B2 | 9/2004 | Xin et al. |
| 6,798,751 B1 | 9/2004 | Voit et al. |
| 6,804,447 B2 | 10/2004 | Smith et al. |
| 6,810,194 B2 | 10/2004 | Griffiths et al. |
| 6,813,412 B2 | 11/2004 | Lin |
| 6,816,660 B2 | 11/2004 | Nashimoto |
| 6,818,834 B1 | 11/2004 | Lin |
| 6,819,856 B2 | 11/2004 | Dagley et al. |
| 6,819,857 B2 | 11/2004 | Douglas et al. |
| 6,822,874 B1 | 11/2004 | Marler |
| 6,826,174 B1 | 11/2004 | Erekson et al. |
| 6,826,346 B2 | 11/2004 | Sloan et al. |
| 6,826,631 B2 | 11/2004 | Webb |
| 6,830,489 B2 | 12/2004 | Aoyama |
| 6,839,428 B2 | 1/2005 | Brower et al. |
| 6,839,438 B1 | 1/2005 | Riegelsberger et al. |
| 6,840,815 B2 | 1/2005 | Musolf et al. |
| 6,845,207 B2 | 1/2005 | Schray |
| 6,847,614 B2 | 1/2005 | Banker et al. |
| 6,848,862 B1 | 2/2005 | Schlig |
| 6,850,685 B2 | 2/2005 | Tinucci et al. |
| 6,853,637 B1 | 2/2005 | Norrell et al. |

(56) References Cited

U.S. PATENT DOCUMENTS

| | | | |
|---|---|---|---|
| 6,854,894 | B1 | 2/2005 | Yunker et al. |
| 6,856,334 | B1 | 2/2005 | Fukui |
| 6,863,444 | B2 | 3/2005 | Anderson et al. |
| 6,863,446 | B2 | 3/2005 | Ngo |
| 6,865,331 | B2 | 3/2005 | Mertesdorf |
| 6,865,334 | B2 | 3/2005 | Cooke et al. |
| 6,866,541 | B2 | 3/2005 | Barker et al. |
| 6,868,216 | B1 | 3/2005 | Gehrke |
| 6,869,227 | B2 | 3/2005 | Del Grosso et al. |
| 6,870,734 | B2 | 3/2005 | Mertesdorf et al. |
| 6,870,997 | B2 | 3/2005 | Cooke |
| 6,879,545 | B2 | 4/2005 | Cooke et al. |
| 6,915,058 | B2 | 7/2005 | Pons |
| 6,920,273 | B2 | 7/2005 | Knudsen |
| 6,920,274 | B2 | 7/2005 | Rapp et al. |
| 6,923,406 | B2 | 8/2005 | Akizuki |
| 6,925,241 | B2 | 8/2005 | Bohle et al. |
| 6,934,451 | B2 | 8/2005 | Cooke |
| 6,934,456 | B2 | 8/2005 | Ferris et al. |
| 6,935,598 | B2 | 8/2005 | Sono et al. |
| 6,937,807 | B2 | 8/2005 | Franklin et al. |
| 6,944,383 | B1 | 9/2005 | Herzog et al. |
| 6,944,389 | B2 * | 9/2005 | Giraud et al. ............... 385/135 |
| 6,945,701 | B2 | 9/2005 | Trezza et al. |
| 6,952,530 | B2 | 10/2005 | Helvajian et al. |
| 6,963,690 | B1 | 11/2005 | Kassal et al. |
| 6,968,107 | B2 | 11/2005 | Belardi et al. |
| 6,968,111 | B2 | 11/2005 | Trebesch et al. |
| 6,985,665 | B2 | 1/2006 | Baechtle |
| 6,993,237 | B2 | 1/2006 | Cooke et al. |
| 7,000,784 | B2 | 2/2006 | Canty et al. |
| 7,005,582 | B2 | 2/2006 | Muller et al. |
| 7,006,748 | B2 | 2/2006 | Dagley et al. |
| 7,007,296 | B2 | 2/2006 | Rakib |
| 7,025,275 | B2 | 4/2006 | Huang et al. |
| 7,027,695 | B2 | 4/2006 | Cooke et al. |
| 7,027,706 | B2 | 4/2006 | Diaz et al. |
| 7,031,588 | B2 | 4/2006 | Cowley et al. |
| 7,035,510 | B2 | 4/2006 | Zimmel et al. |
| 7,038,137 | B2 | 5/2006 | Grubish et al. |
| 7,048,447 | B1 | 5/2006 | Patel et al. |
| 7,054,513 | B2 | 5/2006 | Herz et al. |
| 7,066,748 | B2 | 6/2006 | Bricaud et al. |
| 7,068,907 | B2 | 6/2006 | Schray |
| 7,070,459 | B2 | 7/2006 | Denovich et al. |
| 7,077,710 | B2 | 7/2006 | Haggay et al. |
| 7,079,744 | B2 | 7/2006 | Douglas et al. |
| 7,088,893 | B2 | 8/2006 | Cooke et al. |
| 7,090,406 | B2 | 8/2006 | Melton et al. |
| 7,090,407 | B2 | 8/2006 | Melton et al. |
| 7,094,095 | B1 | 8/2006 | Caveney |
| 7,097,047 | B2 | 8/2006 | Lee et al. |
| 7,101,093 | B2 | 9/2006 | Hsiao et al. |
| 7,102,884 | B2 | 9/2006 | Mertesdorf et al. |
| 7,103,255 | B2 | 9/2006 | Reagan et al. |
| 7,110,654 | B2 | 9/2006 | Dillat |
| 7,111,990 | B2 | 9/2006 | Melton et al. |
| 7,113,679 | B2 | 9/2006 | Melton et al. |
| 7,113,686 | B2 | 9/2006 | Bellekens et al. |
| 7,113,687 | B2 | 9/2006 | Womack et al. |
| 7,116,491 | B1 | 10/2006 | Willey et al. |
| 7,116,883 | B2 | 10/2006 | Kline et al. |
| 7,118,281 | B2 | 10/2006 | Chiu et al. |
| 7,118,405 | B2 | 10/2006 | Peng |
| 7,120,347 | B2 | 10/2006 | Blackwell, Jr. et al. |
| 7,120,348 | B2 | 10/2006 | Trebesch et al. |
| 7,120,349 | B2 | 10/2006 | Elliott |
| 7,127,143 | B2 | 10/2006 | Elkins, II et al. |
| 7,128,471 | B2 | 10/2006 | Wilson |
| 7,136,555 | B2 | 11/2006 | Theuerkorn et al. |
| 7,139,462 | B1 | 11/2006 | Richtman |
| 7,140,903 | B2 | 11/2006 | Pulizzi et al. |
| 7,147,383 | B2 | 12/2006 | Sullivan |
| 7,170,466 | B2 | 1/2007 | Janoschka |
| 7,171,099 | B2 | 1/2007 | Barnes et al. |
| 7,171,100 | B2 | 1/2007 | Solheid et al. |
| 7,171,121 | B1 | 1/2007 | Skarica et al. |
| 7,181,142 | B1 | 2/2007 | Xu et al. |
| 7,186,134 | B2 | 3/2007 | Togami et al. |
| 7,193,783 | B2 | 3/2007 | Willey et al. |
| 7,194,181 | B2 | 3/2007 | Holmberg et al. |
| 7,195,521 | B2 | 3/2007 | Musolf et al. |
| 7,200,314 | B2 | 4/2007 | Womack et al. |
| 7,200,316 | B2 | 4/2007 | Giraud et al. |
| 7,201,595 | B1 | 4/2007 | Morello |
| 7,217,040 | B2 | 5/2007 | Crews et al. |
| 7,218,526 | B2 | 5/2007 | Mayer |
| 7,220,065 | B2 | 5/2007 | Han et al. |
| 7,220,145 | B2 | 5/2007 | Denovich et al. |
| 7,221,832 | B2 | 5/2007 | Tinucci |
| 7,228,036 | B2 | 6/2007 | Elkins, II et al. |
| 7,228,047 | B1 | 6/2007 | Szilagyi et al. |
| 7,231,125 | B2 | 6/2007 | Douglas et al. |
| 7,234,878 | B2 | 6/2007 | Yamauchi et al. |
| 7,236,677 | B2 | 6/2007 | Escoto et al. |
| 7,239,789 | B2 | 7/2007 | Grubish et al. |
| 7,245,809 | B1 | 7/2007 | Gniadek et al. |
| 7,259,325 | B2 | 8/2007 | Pincu et al. |
| 7,266,283 | B2 | 9/2007 | Kline et al. |
| 7,270,485 | B1 | 9/2007 | Robinson et al. |
| 7,272,291 | B2 | 9/2007 | Bayazit et al. |
| 7,274,852 | B1 | 9/2007 | Smrha et al. |
| 7,280,733 | B2 | 10/2007 | Larson et al. ............... 385/139 |
| 7,284,785 | B2 | 10/2007 | Gotou et al. |
| 7,287,913 | B2 | 10/2007 | Keenum et al. |
| 7,289,731 | B2 | 10/2007 | Thinguldstad |
| 7,292,769 | B2 | 11/2007 | Watanabe et al. |
| 7,295,747 | B2 | 11/2007 | Solheid et al. |
| 7,298,950 | B2 | 11/2007 | Frohlich |
| 7,300,216 | B2 | 11/2007 | Morse et al. |
| 7,300,308 | B2 | 11/2007 | Laursen et al. |
| 7,302,149 | B2 | 11/2007 | Swam et al. |
| 7,302,153 | B2 | 11/2007 | Thom |
| 7,302,154 | B2 | 11/2007 | Trebesch et al. |
| 7,308,184 | B2 | 12/2007 | Barnes et al. |
| 7,310,471 | B2 | 12/2007 | Bayazit et al. |
| 7,310,472 | B2 | 12/2007 | Haberman |
| 7,315,681 | B2 | 1/2008 | Kewitsch |
| 7,325,975 | B2 | 2/2008 | Yamada et al. |
| 7,330,624 | B2 | 2/2008 | Isenhour et al. |
| 7,330,625 | B2 | 2/2008 | Barth |
| 7,330,626 | B2 | 2/2008 | Kowalczyk et al. |
| 7,330,629 | B2 | 2/2008 | Cooke et al. |
| 7,331,718 | B2 | 2/2008 | Yazaki et al. |
| 7,340,145 | B2 | 3/2008 | Allen |
| 7,349,615 | B2 | 3/2008 | Frazier et al. |
| 7,352,946 | B2 | 4/2008 | Heller et al. |
| 7,352,947 | B2 | 4/2008 | Phung et al. |
| 7,373,071 | B2 | 5/2008 | Douglas et al. |
| 7,376,321 | B2 | 5/2008 | Bolster et al. |
| 7,376,323 | B2 | 5/2008 | Zimmel |
| 7,391,952 | B1 | 6/2008 | Ugolini et al. |
| 7,397,996 | B2 | 7/2008 | Herzog et al. |
| 7,400,813 | B2 | 7/2008 | Zimmel |
| 7,404,736 | B2 | 7/2008 | Herbst et al. |
| 7,409,137 | B2 | 8/2008 | Barnes |
| 7,414,198 | B2 | 8/2008 | Stansbie et al. |
| 7,417,188 | B2 | 8/2008 | McNutt et al. |
| 7,418,182 | B2 | 8/2008 | Krampotich |
| 7,418,184 | B1 | 8/2008 | Gonzales et al. |
| 7,421,182 | B2 | 9/2008 | Bayazit et al. |
| 7,428,363 | B2 | 9/2008 | Leon et al. |
| 7,435,090 | B1 | 10/2008 | Schriefer et al. |
| 7,437,049 | B2 | 10/2008 | Krampotich |
| 7,439,453 | B2 | 10/2008 | Murano et al. |
| 7,454,113 | B2 | 11/2008 | Barnes |
| 7,460,757 | B2 | 12/2008 | Hoehne et al. |
| 7,460,758 | B2 | 12/2008 | Xin |
| 7,461,981 | B2 | 12/2008 | Yow, Jr. et al. |
| 7,462,779 | B2 | 12/2008 | Caveney et al. |
| 7,463,810 | B2 | 12/2008 | Bayazit et al. |
| 7,463,811 | B2 | 12/2008 | Trebesch et al. |
| 7,469,090 | B2 | 12/2008 | Ferris et al. |
| 7,471,867 | B2 | 12/2008 | Vogel et al. |

(56) References Cited

U.S. PATENT DOCUMENTS

| | | |
|---|---|---|
| 7,474,828 B2 | 1/2009 | Leon et al. |
| 7,477,824 B2 | 1/2009 | Reagan et al. |
| 7,477,826 B2 | 1/2009 | Mullaney et al. |
| 7,480,438 B2 | 1/2009 | Douglas et al. |
| 7,488,205 B2 | 2/2009 | Spisany et al. |
| 7,493,002 B2 | 2/2009 | Coburn et al. |
| 7,496,269 B1 | 2/2009 | Lee |
| 7,499,622 B2 | 3/2009 | Castonguay et al. |
| 7,499,623 B2 | 3/2009 | Barnes et al. |
| 7,506,923 B1 | 3/2009 | Gauss |
| 7,507,111 B2 | 3/2009 | Togami et al. |
| 7,509,015 B2 | 3/2009 | Murano |
| 7,509,016 B2 | 3/2009 | Smith et al. |
| 7,510,421 B2 | 3/2009 | Fransen et al. |
| 7,522,804 B2 | 4/2009 | Araki et al. |
| 7,523,898 B1 | 4/2009 | Barry et al. |
| 7,526,171 B2 | 4/2009 | Caveney et al. |
| 7,526,172 B2 | 4/2009 | Gniadek et al. |
| 7,526,174 B2 | 4/2009 | Leon et al. |
| 7,529,458 B2 | 5/2009 | Spisany et al. |
| 7,534,958 B2 | 5/2009 | McNutt et al. |
| 7,536,075 B2 | 5/2009 | Zimmel |
| 7,540,666 B2 | 6/2009 | Luther et al. |
| 7,542,645 B1 | 6/2009 | Hua et al. |
| 7,544,085 B2 | 6/2009 | Baldwin et al. |
| 7,552,899 B2 | 6/2009 | Chen et al. |
| 7,555,193 B2 | 6/2009 | Rapp et al. |
| 7,558,458 B2 | 7/2009 | Gronvall et al. |
| 7,565,051 B2 | 7/2009 | Vongseng |
| 7,567,744 B2 | 7/2009 | Krampotich et al. |
| 7,570,860 B2 | 8/2009 | Smrha et al. |
| 7,570,861 B2 | 8/2009 | Smrha et al. |
| 7,577,331 B2 | 8/2009 | Laurisch et al. |
| 7,596,293 B2 | 9/2009 | Isenhour et al. |
| 7,603,020 B1 | 10/2009 | Wakileh et al. |
| 7,607,938 B2 | 10/2009 | Clark et al. |
| 7,609,967 B2 | 10/2009 | Hochbaum et al. |
| 7,613,377 B2 | 11/2009 | Gonzales et al. |
| 7,614,903 B1 | 11/2009 | Huang |
| 7,620,287 B2 | 11/2009 | Appenzeller et al. |
| 7,641,398 B2 | 1/2010 | O'Riorden et al. |
| 7,668,430 B2 | 2/2010 | McClellan et al. |
| 7,668,433 B2 | 2/2010 | Bayazit et al. |
| 7,672,561 B1 | 3/2010 | Keith et al. |
| 7,676,135 B2 | 3/2010 | Chen |
| 7,689,079 B2 | 3/2010 | Burnham et al. |
| 7,694,926 B2 | 4/2010 | Allen et al. |
| 7,697,811 B2 | 4/2010 | Murano et al. |
| 7,706,294 B2 | 4/2010 | Natarajan et al. |
| 7,715,125 B2 | 5/2010 | Willey |
| 7,715,683 B2 | 5/2010 | Kowalczyk et al. |
| 7,734,138 B2 | 6/2010 | Bloodworth et al. |
| 7,740,409 B2 | 6/2010 | Bolton et al. |
| 7,743,495 B2 | 6/2010 | Mori et al. |
| 7,751,674 B2 | 7/2010 | Hill |
| 7,751,675 B2 | 7/2010 | Holmberg et al. |
| 7,756,371 B1 | 7/2010 | Burnham et al. |
| 7,756,382 B2 | 7/2010 | Saravanos et al. |
| 7,760,984 B2 | 7/2010 | Solheid et al. |
| 7,764,858 B2 | 7/2010 | Bayazit et al. |
| 7,764,859 B2 | 7/2010 | Krampotich et al. |
| 7,769,266 B2 | 8/2010 | Morris |
| 7,805,044 B2 | 9/2010 | Reagan et al. |
| 7,809,235 B2 | 10/2010 | Reagan et al. |
| 7,811,136 B1 | 10/2010 | Hsieh et al. |
| 7,822,310 B2 | 10/2010 | Castonguay et al. |
| 7,837,495 B2 | 11/2010 | Baldwin et al. |
| 7,850,372 B2 | 12/2010 | Nishimura et al. |
| 7,853,112 B2 | 12/2010 | Zimmel et al. |
| 7,856,166 B2 | 12/2010 | Biribuze et al. |
| 7,862,369 B2 | 1/2011 | Gimenes et al. |
| 7,869,685 B2 | 1/2011 | Hendrickson et al. |
| 7,871,203 B2 | 1/2011 | Iwaya |
| 7,876,580 B2 | 1/2011 | Mayer |
| 7,899,298 B2 | 3/2011 | Cox et al. |
| 7,914,332 B2 | 3/2011 | Song et al. |
| 7,942,589 B2 | 5/2011 | Yazaki et al. |
| 7,945,135 B2 | 5/2011 | Cooke et al. |
| 7,945,136 B2 | 5/2011 | Cooke et al. |
| 7,945,138 B2 | 5/2011 | Hill et al. |
| 7,970,249 B2 | 6/2011 | Solheid et al. |
| 7,970,250 B2 | 6/2011 | Morris |
| 7,991,252 B2 | 8/2011 | Cheng et al. |
| 8,009,959 B2 | 8/2011 | Barnes et al. |
| 8,014,171 B2 | 9/2011 | Kelly et al. |
| 8,014,646 B2 | 9/2011 | Keith et al. |
| 8,020,813 B1 | 9/2011 | Clark et al. |
| 8,059,932 B2 | 11/2011 | Hill et al. |
| 8,093,499 B2 | 1/2012 | Hoffer et al. |
| 8,107,785 B2 | 1/2012 | Berglund et al. |
| 8,131,126 B2 | 3/2012 | Kowalczyk et al. |
| 8,184,938 B2 | 5/2012 | Cooke et al. |
| 8,206,043 B2 | 6/2012 | Thirugnanam et al. |
| 8,206,058 B2 | 6/2012 | Vrondran et al. |
| 8,220,881 B2 | 7/2012 | Keith |
| 8,226,305 B2 | 7/2012 | Thirugnanam et al. |
| 8,249,410 B2 | 8/2012 | Andrus et al. |
| 8,251,591 B2 | 8/2012 | Barnes et al. |
| 8,267,472 B2 | 9/2012 | Large et al. |
| 8,270,798 B2 | 9/2012 | Dagley et al. |
| 8,280,216 B2 | 10/2012 | Cooke et al. |
| 8,285,104 B2 | 10/2012 | Davis et al. |
| 8,290,332 B2 | 10/2012 | Mudd |
| 8,301,004 B2 | 10/2012 | Cooke et al. |
| 8,331,752 B2 | 12/2012 | Biribuze |
| 8,353,494 B2 | 1/2013 | Peng et al. |
| 8,369,679 B2 | 2/2013 | Wakileh et al. |
| 8,391,666 B2 | 3/2013 | Hertzer et al. |
| 8,472,773 B2 | 6/2013 | de Jong |
| 8,491,331 B2 | 7/2013 | Follingstad |
| 8,528,872 B2 | 9/2013 | Mattlin et al. |
| 8,537,477 B2 | 9/2013 | Shioda |
| 8,538,226 B2 | 9/2013 | Makrides-Saravanos et al. |
| 8,559,783 B2 | 10/2013 | Campos et al. |
| 8,873,925 B2 | 10/2014 | Lavoie et al. |
| 2001/0001270 A1 | 5/2001 | Williams Vigliaturo |
| 2001/0010741 A1 | 8/2001 | Hizuka |
| 2001/0029125 A1 | 10/2001 | Morita et al. |
| 2002/0010818 A1 | 1/2002 | Wei et al. |
| 2002/0012353 A1 | 1/2002 | Gerszberg et al. |
| 2002/0028055 A1 | 3/2002 | Shibutani et al. |
| 2002/0034290 A1 | 3/2002 | Pershan |
| 2002/0037139 A1 | 3/2002 | Asao et al. |
| 2002/0064364 A1 | 5/2002 | Battey et al. |
| 2002/0131730 A1 | 9/2002 | Keeble et al. |
| 2002/0136519 A1 | 9/2002 | Tinucci et al. |
| 2002/0141724 A1 | 10/2002 | Ogawa et al. |
| 2002/0150372 A1 | 10/2002 | Schray |
| 2002/0172467 A1 | 11/2002 | Anderson et al. |
| 2002/0180163 A1 | 12/2002 | Muller et al. |
| 2002/0181918 A1 | 12/2002 | Spence et al. |
| 2002/0181922 A1 | 12/2002 | Xin et al. |
| 2002/0191939 A1 | 12/2002 | Daoud et al. |
| 2002/0194596 A1 | 12/2002 | Srivastava |
| 2003/0002802 A1 | 1/2003 | Trezza et al. |
| 2003/0007743 A1 | 1/2003 | Asada |
| 2003/0007767 A1 | 1/2003 | Douglas et al. |
| 2003/0011855 A1 | 1/2003 | Fujiwara |
| 2003/0021539 A1 | 1/2003 | Kwon et al. |
| 2003/0036748 A1 | 2/2003 | Cooper et al. |
| 2003/0051026 A1 | 3/2003 | Carter et al. |
| 2003/0066998 A1 | 4/2003 | Lee |
| 2003/0072551 A1 | 4/2003 | Douglas et al. |
| 2003/0086675 A1 | 5/2003 | Wu et al. |
| 2003/0095753 A1 | 5/2003 | Wada et al. |
| 2003/0147604 A1 | 8/2003 | Tapia et al. |
| 2003/0156552 A1 | 8/2003 | Banker et al. |
| 2003/0174996 A1 | 9/2003 | Henschel et al. |
| 2003/0180004 A1 | 9/2003 | Cox et al. |
| 2003/0180012 A1 | 9/2003 | Deane et al. |
| 2003/0183413 A1 | 10/2003 | Kato |
| 2003/0199201 A1 | 10/2003 | Mullaney et al. |
| 2003/0210882 A1 | 11/2003 | Barthel et al. |
| 2003/0223723 A1 | 12/2003 | Massey et al. |

(56) References Cited

U.S. PATENT DOCUMENTS

| | | |
|---|---|---|
| 2003/0223725 A1 | 12/2003 | Laporte et al. |
| 2003/0235387 A1 | 12/2003 | Dufour |
| 2004/0001717 A1 | 1/2004 | Bennett et al. |
| 2004/0013389 A1 | 1/2004 | Taylor |
| 2004/0013390 A1 | 1/2004 | Kim et al. |
| 2004/0022494 A1 | 2/2004 | Liddle et al. |
| 2004/0024934 A1 | 2/2004 | Webb |
| 2004/0067036 A1 | 4/2004 | Clark et al. |
| 2004/0074852 A1 | 4/2004 | Knudsen et al. |
| 2004/0086238 A1 | 5/2004 | Finona et al. |
| 2004/0086252 A1 | 5/2004 | Smith et al. |
| 2004/0120679 A1 | 6/2004 | Vincent et al. |
| 2004/0147159 A1 | 7/2004 | Urban et al. |
| 2004/0151465 A1 | 8/2004 | Krampotich et al. |
| 2004/0175090 A1 | 9/2004 | Vastmans et al. |
| 2004/0192115 A1 | 9/2004 | Bugg |
| 2004/0196841 A1 | 10/2004 | Tudor et al. |
| 2004/0208459 A1 | 10/2004 | Mizue et al. |
| 2004/0228598 A1 | 11/2004 | Allen et al. |
| 2004/0240827 A1 | 12/2004 | Daoud et al. |
| 2004/0240882 A1 | 12/2004 | Lipski et al. |
| 2004/0264873 A1 | 12/2004 | Smith et al. |
| 2005/0002633 A1 | 1/2005 | Solheid et al. |
| 2005/0008131 A1 | 1/2005 | Cook |
| 2005/0026497 A1 | 2/2005 | Holliday |
| 2005/0036749 A1 | 2/2005 | Vogel et al. |
| 2005/0067358 A1 | 3/2005 | Lee et al. |
| 2005/0069248 A1 | 3/2005 | Jasti et al. |
| 2005/0074990 A1 | 4/2005 | Shearman et al. |
| 2005/0076149 A1 | 4/2005 | McKown et al. |
| 2005/0083959 A1 | 4/2005 | Binder |
| 2005/0107086 A1 | 5/2005 | Tell et al. |
| 2005/0111800 A1 | 5/2005 | Cooke et al. |
| 2005/0111809 A1 | 5/2005 | Giraud et al. |
| 2005/0123261 A1 | 6/2005 | Bellekens et al. |
| 2005/0129379 A1 | 6/2005 | Reagan et al. |
| 2005/0178573 A1 | 8/2005 | James |
| 2005/0185910 A1 | 8/2005 | Zimmel |
| 2005/0201073 A1 | 9/2005 | Pincu et al. |
| 2005/0232550 A1 | 10/2005 | Nakajima et al. |
| 2005/0232566 A1 | 10/2005 | Rapp et al. |
| 2005/0233647 A1 | 10/2005 | Denovich et al. |
| 2005/0254757 A1 | 11/2005 | Ferretti, III et al. |
| 2005/0281526 A1 | 12/2005 | Vongseng et al. |
| 2005/0285493 A1 | 12/2005 | Hu et al. |
| 2006/0007562 A1 | 1/2006 | Willey et al. |
| 2006/0018448 A1 | 1/2006 | Stevens et al. |
| 2006/0018622 A1 | 1/2006 | Caveney et al. |
| 2006/0034048 A1 | 2/2006 | Xu |
| 2006/0039290 A1 | 2/2006 | Roden et al. |
| 2006/0044774 A1 | 3/2006 | Vasavda et al. |
| 2006/0045458 A1 | 3/2006 | Sasaki et al. |
| 2006/0072606 A1 | 4/2006 | Posthuma |
| 2006/0077968 A1 | 4/2006 | Pitsoulakis et al. |
| 2006/0093302 A1 | 5/2006 | Solheid et al. |
| 2006/0093303 A1 | 5/2006 | Reagan et al. |
| 2006/0127026 A1 | 6/2006 | Beck |
| 2006/0133736 A1 | 6/2006 | Sullivan |
| 2006/0133759 A1 | 6/2006 | Mullaney et al. |
| 2006/0147172 A1 | 7/2006 | Luther et al. |
| 2006/0153517 A1 | 7/2006 | Reagan et al. |
| 2006/0160377 A1 | 7/2006 | Huang |
| 2006/0165365 A1 | 7/2006 | Feustel et al. |
| 2006/0165366 A1 | 7/2006 | Feustel et al. |
| 2006/0191700 A1 | 8/2006 | Herzog et al. |
| 2006/0193590 A1 | 8/2006 | Puetz et al. |
| 2006/0193591 A1 | 8/2006 | Rapp et al. |
| 2006/0198098 A1 | 9/2006 | Clark et al. |
| 2006/0204179 A1 | 9/2006 | Patel et al. |
| 2006/0215980 A1 | 9/2006 | Bayazit et al. |
| 2006/0225912 A1 | 10/2006 | Clark et al. |
| 2006/0228087 A1 | 10/2006 | Bayazit et al. |
| 2006/0269194 A1 | 11/2006 | Luther et al. |
| 2006/0269206 A1 | 11/2006 | Zimmel |
| 2006/0269208 A1 | 11/2006 | Allen et al. |
| 2006/0275008 A1 | 12/2006 | Xin |
| 2006/0275009 A1 | 12/2006 | Ellison et al. |
| 2006/0285812 A1 | 12/2006 | Ferris et al. |
| 2007/0003204 A1 | 1/2007 | Makrides-Saravanos et al. |
| 2007/0025070 A1 | 2/2007 | Jiang et al. |
| 2007/0031099 A1 | 2/2007 | Herzog et al. |
| 2007/0033629 A1 | 2/2007 | McGranahan et al. |
| 2007/0047894 A1 | 3/2007 | Holmberg et al. |
| 2007/0058641 A1 | 3/2007 | Cicchetti et al. |
| 2007/0086723 A1 | 4/2007 | Sasaki et al. |
| 2007/0092195 A1 | 4/2007 | Solheid et al. |
| 2007/0104447 A1 | 5/2007 | Allen |
| 2007/0110373 A1 | 5/2007 | Dudek et al. |
| 2007/0131628 A1 | 6/2007 | Mimlitch, III et al. |
| 2007/0183732 A1 | 8/2007 | Wittmeier et al. |
| 2007/0189692 A1 | 8/2007 | Zimmel et al. |
| 2007/0196071 A1 | 8/2007 | Laursen et al. |
| 2007/0221793 A1 | 9/2007 | Kusuda et al. |
| 2007/0237484 A1 | 10/2007 | Reagan et al. |
| 2007/0257159 A1 | 11/2007 | Nelson et al. |
| 2007/0266192 A1 | 11/2007 | Campini et al. |
| 2007/0274718 A1 | 11/2007 | Bridges et al. |
| 2008/0011514 A1 | 1/2008 | Zheng et al. |
| 2008/0025683 A1 | 1/2008 | Murano |
| 2008/0031585 A1 | 2/2008 | Solheid et al. |
| 2008/0063350 A1 | 3/2008 | Trebesch et al. |
| 2008/0068788 A1 | 3/2008 | Ozawa et al. |
| 2008/0069511 A1 | 3/2008 | Blackwell, Jr. et al. |
| 2008/0069512 A1 | 3/2008 | Barnes et al. |
| 2008/0069513 A1 | 3/2008 | Desanti |
| 2008/0078899 A1 | 4/2008 | Chen et al. |
| 2008/0080826 A1 | 4/2008 | Leon et al. |
| 2008/0080827 A1 | 4/2008 | Leon et al. |
| 2008/0080828 A1 | 4/2008 | Leon et al. |
| 2008/0085094 A1 | 4/2008 | Krampotich |
| 2008/0089656 A1 | 4/2008 | Wagner et al. |
| 2008/0095502 A1 | 4/2008 | McColloch |
| 2008/0095541 A1 | 4/2008 | Dallesasse |
| 2008/0100440 A1 | 5/2008 | Downie et al. |
| 2008/0106871 A1 | 5/2008 | James |
| 2008/0112681 A1 | 5/2008 | Battey et al. |
| 2008/0118207 A1 | 5/2008 | Yamamoto et al. |
| 2008/0121423 A1 | 5/2008 | Vogel et al. |
| 2008/0124039 A1 | 5/2008 | Gniadek et al. |
| 2008/0131068 A1 | 6/2008 | Mertesdorf et al. |
| 2008/0145013 A1 | 6/2008 | Escoto et al. |
| 2008/0152294 A1 | 6/2008 | Hirano et al. |
| 2008/0166094 A1 | 7/2008 | Bookbinder et al. |
| 2008/0166131 A1 | 7/2008 | Hudgins et al. |
| 2008/0175550 A1 | 7/2008 | Coburn et al. |
| 2008/0175551 A1 | 7/2008 | Smrha et al. |
| 2008/0175552 A1 | 7/2008 | Smrha et al. |
| 2008/0193091 A1 | 8/2008 | Herbst |
| 2008/0205823 A1 | 8/2008 | Luther et al. |
| 2008/0205843 A1 | 8/2008 | Castonguay et al. |
| 2008/0205844 A1 | 8/2008 | Castonguay et al. |
| 2008/0212928 A1 | 9/2008 | Kowalczyk et al. |
| 2008/0219632 A1 | 9/2008 | Smith et al. |
| 2008/0219634 A1 | 9/2008 | Rapp et al. |
| 2008/0236858 A1 | 10/2008 | Quijano |
| 2008/0247723 A1 | 10/2008 | Herzog et al. |
| 2008/0260344 A1 | 10/2008 | Smith et al. |
| 2008/0260345 A1 | 10/2008 | Mertesdorf et al. |
| 2008/0267573 A1 | 10/2008 | Douglas et al. |
| 2008/0285934 A1 | 11/2008 | Standish et al. |
| 2008/0292261 A1 | 11/2008 | Kowalczyk et al. |
| 2008/0296060 A1 | 12/2008 | Hawley et al. |
| 2008/0298763 A1 | 12/2008 | Appenzeller et al. |
| 2008/0310810 A1 | 12/2008 | Gallagher |
| 2009/0010607 A1 | 1/2009 | Elisson et al. |
| 2009/0016685 A1 | 1/2009 | Hudgins et al. |
| 2009/0022467 A1 | 1/2009 | Puetz et al. |
| 2009/0022470 A1 | 1/2009 | Krampotich |
| 2009/0038845 A1 | 2/2009 | Fransen et al. |
| 2009/0060439 A1 | 3/2009 | Cox et al. |
| 2009/0060440 A1 | 3/2009 | Wright et al. |
| 2009/0067800 A1 | 3/2009 | Vazquez et al. |
| 2009/0074371 A1 | 3/2009 | Bayazit et al. |
| 2009/0080849 A1 | 3/2009 | Hankins et al. |

(56) References Cited

U.S. PATENT DOCUMENTS

| | | |
|---|---|---|
| 2009/0097813 A1 | 4/2009 | Hill |
| 2009/0110347 A1 | 4/2009 | Jacobsson |
| 2009/0121092 A1 | 5/2009 | Keith |
| 2009/0136194 A1 | 5/2009 | Barnes |
| 2009/0136195 A1 | 5/2009 | Smrha et al. |
| 2009/0136196 A1 | 5/2009 | Trebesch et al. |
| 2009/0146342 A1 | 6/2009 | Haney et al. |
| 2009/0148117 A1 | 6/2009 | Laurisch |
| 2009/0166404 A1 | 7/2009 | German et al. |
| 2009/0169163 A1 | 7/2009 | Abbott, III et al. |
| 2009/0175588 A1 | 7/2009 | Brandt et al. |
| 2009/0180749 A1 | 7/2009 | Douglas et al. |
| 2009/0184221 A1 | 7/2009 | Sculler |
| 2009/0185782 A1 | 7/2009 | Parikh et al. |
| 2009/0191891 A1 | 7/2009 | Ma et al. |
| 2009/0194647 A1 | 8/2009 | Keith |
| 2009/0196563 A1 | 8/2009 | Mullsteff et al. |
| 2009/0202214 A1 | 8/2009 | Holmberg et al. |
| 2009/0207577 A1 | 8/2009 | Fransen et al. |
| 2009/0208178 A1 | 8/2009 | Kowalczyk et al. |
| 2009/0208210 A1 | 8/2009 | Trojer et al. |
| 2009/0212679 A1 | 8/2009 | Frousiakis et al. |
| 2009/0214171 A1 | 8/2009 | Coburn et al. |
| 2009/0220200 A1 | 9/2009 | Sheau Tung Wong et al. |
| 2009/0220204 A1 | 9/2009 | Ruiz |
| 2009/0226142 A1 | 9/2009 | Barnes et al. |
| 2009/0238531 A1 | 9/2009 | Holmberg et al. |
| 2009/0245743 A1 | 10/2009 | Cote et al. |
| 2009/0245744 A1 | 10/2009 | Smith et al. |
| 2009/0252472 A1 | 10/2009 | Solheid et al. |
| 2009/0257726 A1 | 10/2009 | Redmann et al. |
| 2009/0257727 A1 | 10/2009 | Laurisch et al. |
| 2009/0257754 A1 | 10/2009 | Theodoras, II et al. |
| 2009/0263096 A1 | 10/2009 | Solheid et al. |
| 2009/0263122 A1 | 10/2009 | Helkey et al. |
| 2009/0267865 A1 | 10/2009 | Miller et al. |
| 2009/0269016 A1 | 10/2009 | Korampally et al. |
| 2009/0269018 A1 | 10/2009 | Frohlich et al. |
| 2009/0269019 A1 | 10/2009 | Andrus et al. |
| 2009/0274429 A1 | 11/2009 | Krampotich et al. |
| 2009/0274430 A1 | 11/2009 | Krampotich et al. |
| 2009/0274432 A1 | 11/2009 | Iwaya |
| 2009/0290842 A1 | 11/2009 | Bran de Leon et al. |
| 2009/0297111 A1 | 12/2009 | Reagan et al. |
| 2009/0297112 A1 | 12/2009 | Mertesdorf et al. |
| 2009/0304342 A1 | 12/2009 | Adomeit et al. |
| 2009/0324189 A1 | 12/2009 | Hill et al. |
| 2010/0003000 A1 | 1/2010 | Rapp et al. |
| 2010/0012671 A1 | 1/2010 | Vrondran et al. |
| 2010/0027953 A1 | 2/2010 | Russell |
| 2010/0054669 A1 | 3/2010 | DiMarco |
| 2010/0054681 A1 | 3/2010 | Biribuze et al. |
| 2010/0054682 A1 | 3/2010 | Cooke et al. |
| 2010/0054683 A1 | 3/2010 | Cooke et al. |
| 2010/0054684 A1 | 3/2010 | Cooke et al. |
| 2010/0054685 A1 | 3/2010 | Cooke et al. |
| 2010/0054686 A1 | 3/2010 | Cooke et al. |
| 2010/0054687 A1 | 3/2010 | Ye et al. |
| 2010/0061693 A1 | 3/2010 | Bran de Leon et al. |
| 2010/0074587 A1 | 3/2010 | Loeffelholz et al. |
| 2010/0080517 A1 | 4/2010 | Cline et al. |
| 2010/0086267 A1 | 4/2010 | Cooke et al. |
| 2010/0086274 A1 | 4/2010 | Keith |
| 2010/0111483 A1 | 5/2010 | Reinhardt et al. |
| 2010/0119201 A1 | 5/2010 | Smrha et al. |
| 2010/0129035 A1 | 5/2010 | Teo |
| 2010/0142544 A1 | 6/2010 | Chapel et al. |
| 2010/0142910 A1 | 6/2010 | Hill et al. |
| 2010/0150518 A1 | 6/2010 | Leon et al. |
| 2010/0158467 A1 | 6/2010 | Hou et al. |
| 2010/0166377 A1 | 7/2010 | Nair et al. |
| 2010/0171350 A1 | 7/2010 | Large et al. |
| 2010/0178022 A1 | 7/2010 | Schroeder et al. |
| 2010/0195970 A1 | 8/2010 | Mudd et al. |
| 2010/0202740 A1 | 8/2010 | Barlowe et al. |
| 2010/0202745 A1 | 8/2010 | Sokolowski et al. |
| 2010/0202748 A1 | 8/2010 | Pierce et al. |
| 2010/0220967 A1 | 9/2010 | Cooke et al. |
| 2010/0220968 A1 | 9/2010 | Dagley et al. |
| 2010/0247051 A1 | 9/2010 | Kowalczyk et al. |
| 2010/0266245 A1 | 10/2010 | Sabo |
| 2010/0278499 A1 | 11/2010 | Mures et al. |
| 2010/0296790 A1 | 11/2010 | Cooke et al. |
| 2010/0296791 A1 | 11/2010 | Makrides-Saravanos et al. |
| 2010/0310225 A1 * | 12/2010 | Anderson et al. ............ 385/135 |
| 2010/0310226 A1 | 12/2010 | Wakileh et al. |
| 2010/0314341 A1 | 12/2010 | Bailey |
| 2010/0316334 A1 | 12/2010 | Kewitsch |
| 2010/0322554 A1 | 12/2010 | Barnes et al. |
| 2010/0322579 A1 | 12/2010 | Cooke et al. |
| 2010/0322580 A1 | 12/2010 | Beamon et al. |
| 2010/0322581 A1 | 12/2010 | Cooke et al. |
| 2010/0322582 A1 | 12/2010 | Cooke et al. |
| 2010/0322583 A1 | 12/2010 | Cooke et al. |
| 2010/0329624 A1 | 12/2010 | Zhou et al. |
| 2011/0008004 A1 | 1/2011 | Liao et al. |
| 2011/0038592 A1 | 2/2011 | Mudd |
| 2011/0069931 A1 | 3/2011 | Cote et al. |
| 2011/0073730 A1 | 3/2011 | Kitchen |
| 2011/0085774 A1 | 4/2011 | Murphy et al. |
| 2011/0085776 A1 | 4/2011 | Biribuze et al. |
| 2011/0097053 A1 | 4/2011 | Smith et al. |
| 2011/0097977 A1 | 4/2011 | Bubnick et al. |
| 2011/0129185 A1 | 6/2011 | Lewallen et al. |
| 2011/0129186 A1 | 6/2011 | Lewallen et al. |
| 2011/0186532 A1 | 8/2011 | Wu |
| 2011/0192631 A1 | 8/2011 | Burek et al. |
| 2011/0211799 A1 | 9/2011 | Conner et al. |
| 2011/0217014 A1 | 9/2011 | Dominique |
| 2011/0217016 A1 | 9/2011 | Mullsteff |
| 2011/0222821 A1 | 9/2011 | Pitwon et al. |
| 2011/0235979 A1 | 9/2011 | Anderson et al. |
| 2011/0249950 A1 | 10/2011 | Chapa Ramirez et al. |
| 2011/0268404 A1 | 11/2011 | Cote et al. |
| 2011/0268405 A1 | 11/2011 | Cote et al. |
| 2011/0268407 A1 | 11/2011 | Cowen et al. |
| 2011/0268408 A1 | 11/2011 | Giraud et al. |
| 2011/0268413 A1 | 11/2011 | Cote et al. |
| 2011/0268414 A1 | 11/2011 | Giraud et al. |
| 2011/0280537 A1 | 11/2011 | Cowen et al. |
| 2011/0299823 A1 | 12/2011 | Bran De Leon et al. |
| 2012/0025683 A1 | 2/2012 | Mattlin et al. |
| 2012/0051707 A1 | 3/2012 | Barnes et al. |
| 2012/0057838 A1 | 3/2012 | Hill et al. |
| 2012/0106899 A1 | 5/2012 | Choi |
| 2012/0183263 A1 | 7/2012 | Wu |
| 2012/0183289 A1 | 7/2012 | Lou et al. |
| 2012/0219263 A1 | 8/2012 | Beamon et al. |
| 2012/0288244 A1 | 11/2012 | Wu et al. |
| 2012/0288248 A1 | 11/2012 | Chapa Ramirez et al. |
| 2012/0301083 A1 | 11/2012 | Carter et al. |
| 2013/0004136 A1 | 1/2013 | Brower et al. |
| 2013/0058616 A1 | 3/2013 | Cote et al. |
| 2013/0077927 A1 | 3/2013 | O'Connor |
| 2013/0209049 A1 | 8/2013 | Kowalczyk et al. |
| 2013/0214108 A1 | 8/2013 | Irudayaraj et al. |
| 2013/0266282 A1 | 10/2013 | Cote et al. |
| 2013/0308916 A1 | 11/2013 | Buff et al. |
| 2013/0322839 A1 | 12/2013 | Claessens et al. |
| 2014/0003782 A1 | 1/2014 | Blackwell, Jr. et al. |
| 2014/0010510 A1 | 1/2014 | Blackard |
| 2014/0112628 A1 | 4/2014 | Keenum et al. |

FOREIGN PATENT DOCUMENTS

| | | |
|---|---|---|
| CA | 2186314 A1 | 4/1997 |
| CA | 2765835 A1 | 1/2011 |
| CH | 688705 A5 | 1/1998 |
| CN | 102460258 A | 5/2012 |
| DE | 8711970 U1 | 10/1987 |
| DE | 3726718 A1 | 2/1989 |
| DE | 3726719 A1 | 2/1989 |
| DE | 4030301 A1 | 3/1992 |
| DE | 4231181 C1 | 8/1993 |

(56) References Cited

FOREIGN PATENT DOCUMENTS

| | | |
|---|---|---|
| DE | 20115940 U1 | 1/2002 |
| DE | 10338848 A1 | 3/2005 |
| DE | 202005009932 U1 | 11/2005 |
| DE | 202007000556 U1 | 10/2007 |
| DE | 102007024476 A1 | 11/2008 |
| DE | 202010009385 U1 | 9/2010 |
| EP | 29512 A1 | 6/1981 |
| EP | 0105597 A2 | 4/1984 |
| EP | 0250900 A2 | 1/1988 |
| EP | 0408266 A2 | 1/1991 |
| EP | 0474091 A1 | 8/1991 |
| EP | 0468671 A1 | 1/1992 |
| EP | 0490698 A1 | 6/1992 |
| EP | 0529830 A1 | 3/1993 |
| EP | 0544004 A1 | 6/1993 |
| EP | 0547778 A1 | 6/1993 |
| EP | 0581527 A1 | 2/1994 |
| EP | 0620462 A1 | 10/1994 |
| EP | 0693699 A1 | 1/1996 |
| EP | 0720322 A2 | 7/1996 |
| EP | 0776557 B1 | 6/1997 |
| EP | 0940700 A2 | 9/1999 |
| EP | 0949522 A2 | 10/1999 |
| EP | 1041417 A2 | 10/2000 |
| EP | 1056177 A1 | 11/2000 |
| EP | 1065542 A1 | 1/2001 |
| EP | 1162485 A2 | 12/2001 |
| EP | 1203974 A2 | 5/2002 |
| EP | 1289319 A2 | 3/2003 |
| EP | 1310816 A2 | 5/2003 |
| EP | 1316829 A2 | 6/2003 |
| EP | 1367308 A1 | 12/2003 |
| EP | 1621907 A1 | 2/2006 |
| EP | 1777563 A1 | 4/2007 |
| EP | 2060942 A2 | 5/2009 |
| EP | 1280363 B1 | 9/2009 |
| EP | 2159613 A2 | 3/2010 |
| EP | 2639613 A1 | 9/2013 |
| FR | 1586331 A | 2/1970 |
| FR | 2123728 A5 | 9/1972 |
| FR | 2378378 A1 | 8/1978 |
| GB | 2241591 A | 9/1991 |
| GB | 2277812 A | 11/1994 |
| GB | 2367378 A | 4/2002 ............... G02B 6/44 |
| GB | 2367379 A | 4/2002 |
| GB | 2368136 A | 4/2002 ............... G02B 6/36 |
| GB | 2377839 A | 1/2003 |
| JP | 3060994 A | 3/1991 |
| JP | 3172806 A | 7/1991 |
| JP | 3281378 A | 12/1991 |
| JP | 5045541 A | 2/1993 |
| JP | 06018749 A | 1/1994 |
| JP | 7308011 A | 11/1995 |
| JP | 7318761 A | 12/1995 |
| JP | 8007308 A | 1/1996 |
| JP | 8248235 A | 9/1996 |
| JP | 8248237 A | 9/1996 |
| JP | 3487946 A | 10/1996 |
| JP | 8254620 A | 10/1996 |
| JP | 3279474 A | 10/1997 |
| JP | 9258033 A | 10/1997 |
| JP | 9258055 A | 10/1997 |
| JP | 2771870 B2 | 7/1998 |
| JP | 3448448 A | 8/1998 |
| JP | 10227919 A | 8/1998 |
| JP | 3478944 A | 12/1998 |
| JP | 10332945 A | 12/1998 |
| JP | 10339817 A | 12/1998 |
| JP | 11023858 A | 1/1999 |
| JP | 2000098138 A | 4/2000 |
| JP | 2000098139 A | 4/2000 |
| JP | 2000241631 A | 9/2000 |
| JP | 2001004849 A | 1/2001 |
| JP | 3160322 B2 | 4/2001 |
| JP | 2001133636 A | 5/2001 |
| JP | 3173962 B2 | 6/2001 |
| JP | 3176906 B2 | 6/2001 |
| JP | 2001154030 A | 6/2001 |
| JP | 2001159714 A | 6/2001 |
| JP | 2002022974 A | 1/2002 |
| JP | 2002077236 A | 3/2002 |
| JP | 2002116337 A | 4/2002 |
| JP | 2002169035 A | 6/2002 |
| JP | 3312893 B2 | 8/2002 |
| JP | 2002305389 A | 10/2002 |
| JP | 3344701 B2 | 11/2002 |
| JP | 2003029054 A | 1/2003 |
| JP | 3403573 B2 | 5/2003 |
| JP | 2003169026 A | 6/2003 |
| JP | 2003215353 A | 7/2003 |
| JP | 2003344701 A | 12/2003 |
| JP | 3516765 B2 | 4/2004 |
| JP | 2004144808 A | 5/2004 |
| JP | 2004514931 A | 5/2004 |
| JP | 3542939 B2 | 7/2004 |
| JP | 2004246147 A | 9/2004 |
| JP | 2004361652 A | 12/2004 |
| JP | 2004361893 A | 12/2004 |
| JP | 3107704 U | 2/2005 |
| JP | 2005055748 A | 3/2005 |
| JP | 2005062569 A | 3/2005 |
| JP | 2005084241 A | 3/2005 |
| JP | 2005148327 A | 6/2005 |
| JP | 2005257937 A | 9/2005 |
| JP | 3763645 B2 | 4/2006 |
| JP | 3778021 B2 | 5/2006 |
| JP | 2006126513 A | 5/2006 |
| JP | 2006126516 A | 5/2006 |
| JP | 3794540 B2 | 7/2006 |
| JP | 2006227041 A1 | 8/2006 |
| JP | 3833638 B2 | 10/2006 |
| JP | 2006292924 A | 10/2006 |
| JP | 3841344 B2 | 11/2006 |
| JP | 3847533 B2 | 11/2006 |
| JP | 200747336 A | 2/2007 |
| JP | 3896035 B2 | 3/2007 |
| JP | 2007067458 A1 | 3/2007 |
| JP | 3934052 B2 | 6/2007 |
| JP | 3964191 B2 | 8/2007 |
| JP | 3989853 B2 | 10/2007 |
| JP | 4026244 B2 | 12/2007 |
| JP | 4029494 B2 | 1/2008 |
| JP | 4065223 B2 | 3/2008 |
| JP | 4093475 B2 | 6/2008 |
| JP | 4105696 B2 | 6/2008 |
| JP | 4112437 B2 | 7/2008 |
| JP | 4118862 B2 | 7/2008 |
| JP | 2008176118 A1 | 7/2008 |
| JP | 2008180817 A1 | 8/2008 |
| JP | 4184329 B2 | 11/2008 |
| JP | 2008271017 A | 11/2008 |
| JP | 2008542822 T | 11/2008 |
| JP | 2009503582 T | 1/2009 |
| JP | 2009229506 A | 10/2009 |
| JP | 2012065019 A | 3/2012 |
| KR | 20110037404 A | 4/2011 |
| WO | 9105281 A1 | 4/1991 |
| WO | 9326070 A1 | 12/1993 |
| WO | 9520175 A1 | 7/1995 |
| WO | 9636896 A1 | 11/1996 |
| WO | 9638752 A1 | 12/1996 |
| WO | 9712268 A1 | 4/1997 |
| WO | 9722025 A1 | 6/1997 |
| WO | 9736197 A1 | 10/1997 |
| WO | 9744605 A1 | 11/1997 |
| WO | 9825416 A1 | 6/1998 |
| WO | 9927404 A1 | 6/1999 |
| WO | 0005611 A2 | 2/2000 |
| WO | 0127660 A2 | 4/2001 |
| WO | 0130007 A2 | 4/2001 |
| WO | 0180596 A1 | 10/2001 |
| WO | 0242818 A1 | 5/2002 |
| WO | 03009527 A2 | 1/2003 |
| WO | 03014943 A1 | 2/2003 |

(56) References Cited

FOREIGN PATENT DOCUMENTS

| | | | |
|---|---|---|---|
| WO | 2004052066 A1 | 6/2004 | |
| WO | 2005020400 A1 | 3/2005 | |
| WO | 2006076062 A | 7/2006 | |
| WO | 2006108024 A1 | 10/2006 | |
| WO | 2007050515 A1 | 5/2007 | |
| WO | 2007079074 A2 | 7/2007 | |
| WO | 2007089682 A2 | 8/2007 | |
| WO | 2007149215 A2 | 12/2007 | |
| WO | 2008027201 A2 | 3/2008 | |
| WO | 2008063054 A2 | 5/2008 | |
| WO | 2008113054 A2 | 9/2008 | |
| WO | 2008157248 A1 | 12/2008 | |
| WO | 2009026688 A1 | 3/2009 | |
| WO | 2009029485 A1 | 3/2009 | |
| WO | 2009030360 A1 | 3/2009 | |
| WO | 2009120280 A2 | 10/2009 | |
| WO | 2010024847 A2 | 3/2010 | |
| WO | 2010080745 A1 | 7/2010 | |
| WO | 2011005461 A1 | 1/2011 | |
| WO | 2011059955 A1 | 5/2011 | ............... G02B 6/44 |

OTHER PUBLICATIONS

Non-final Office Action for U.S. Appl. No. 14/060,966 mailed Jul. 31, 2014, 10 pages.
Non-final Office Action for U.S. Appl. No. 13/795,888 mailed Aug. 1, 2014, 23 pages.
Non-final Office Action for U.S. Appl. No. 13/282,028 mailed Jul. 7, 2014, 17 pages.
Corning Cable Systems, "MTX Frames and Accessories," Feb. 2006, 4 pages.
Panduit, "Lock-in LC Duplex Clip," Accessed Mar. 22, 2012, 1 page.
Corning Cable Systems, "Corning Cable Systems Products for BellSouth High Density Shelves," Jun. 2000, 2 pages.
Corning Cable Systems, "Corning Cable Systems Quick Reference Guide for Verizon FTTP FDH Products," Jun. 2005, 4 pages.
Conner, M. "Passive Optical Design for RFOG and Beyond," Braodband Properties, Apr. 2009, pp. 78-81.
Corning Evolant, "Eclipse Hardware Family," Nov. 2009, 1 page.
Corning Evolant, "Enhanced Management Frame," Dec. 2009, 1 page.
Corning Evolant, "Enhanced Management Frame (EMF)," Specification Sheet, Nov. 2009, 24 pages.
Corning Cable Systems, "Evolant Solutions for Evolving Networks: Fiber Optic Hardware," Oct. 2002, 2 pages.
Corning Cable Systems, "Fiber Optic Hardware with Factory-Installed Pigtails: Features and Benefits," Nov. 2010, 12 pages.
Corning Cable Systems, "FiberManager System 1- and 3-Position Compact Shelves," Jan. 2003, 4 pages.
Corning Cable Systems, "FiberManager System Frame and Components," Jan. 2003, 12 pages.
Corning Cable Systems, "High Density Frame," Jul. 2001, 2 pages.
Corning Cable Systems, "High Density Frame (HDF) Connector-Splice Shelves and Housings," May 2003, 4 pages.
Siecor, "Single Shelf HDF with Slack Storage and Heat Shield (HH1-CSH-1238-1V-BS)," Jan. 1998, 12 pages.
Corning Cable Systems, "Mass Termination Xchange (MTX) Frame System Equipment Office Planning and Application Guide," SRP003-664, Issue 1, Mar. 2005, 57 pages.
Corning Cable Systems, "Mass Termination Xchange (MTX) Equipment Patch Cord Interbay Vertical Channel," SRP003-684, Issue 1, Mar. 2005, 8 pages.
Corning Cable Systems, "High Density Frame (HDF) Installation," SRP003-355, Issue 4, Sep. 2002, 18 pages.
"MPO Fiber Optic Rack Panels now available from L-com Connectivity Products," article dated Jun. 4, 2007, 16 pages, http://www.l-com.com/content/Article.aspx?Type=P&ID=438.
"19" Rack Panel with 16 MPO Fiber Optic Couplers—1U high," product page, accessed Oct. 23, 2012, 2 pages, http://www.l-com.com/item.aspx?id=9767#.UlbgG8XXay5.
"Drawing for L-com 1U Panel with 16 MTP couplers," May 15, 2007, 1 page, http://www.l-com.com/multimedia/eng_drawings/PR17516MTP.pdf.
"RapidNet Fibre MTP VHD Cassette," Brochure, Date Unknown, 1 page, http://www.hellermanntyton.se/documents/5000/576_fiber_1U.pdf.
"MPO for Gigabit Ethernet/FAS-NET MTP Solution," Brochure, Date Unknown, 11 pages, http://www.infinique.com/upload/13182286190.pdf.
"Hubbell OptiChannel High Density 144 Port 1U Fiber Enclosure," Brochure, Date Unknown, 2 pages, http://www.hubbell-premise.com/literature/PLDF010.pdf.
Unknown, Author, "QuickNet SFQ Series MTP Fiber Optic Cassettes," Panduit Specification Sheet, Jan. 2009, 2 pages.
Unknown Author, "Cellular Specialties introduces the first simulated in-building location-based tracking solution," smart-grid.tmenet.com/news, Sep. 14, 2009, 2 pages.
Unknown Author, "CDMA Co-Pilot Transmitter," Cellular Specialties, Inc., Aug. 2009, 2 pages.
Ramdas, "Modern File Systems and Storage," Proceedings of the 2nd International SANE Conference, May 22-25, 2000, MECC, Maastricht, The Netherlands, Copyright Rodney R. Ramdas, 10 pages.
Author Unknown, "144 Fiber Patch Panel 1U," Technical Data, ADTEK Group Limited, 2009, 2 pages.
Author Unknown, "FiberManager Frame Cross-connect Configuration Fiber Tracing Option: Installation and Maintenance," Siecor Corporation, A0402884, Release 04.00, Jul. 1995, 80 pages.
Author Unknown, "FOS-FDF", Corning Cable Systems, SRP-003-305, Issue 4, Mar. 2001, 17 pages.
Author Unknown, "Optical Management Shelf (OMS)," Corning Cable Systems, Standard Recommended Procedure (SRP) 003-600, Issue 3, Apr. 2004, 9 pages.
Author Unknown, "Single Shelf HDF Installation," Standard Recommended Procedure (SRP) 003-377, Corning Cable Systems, Issue 5, Aug. 2001, pp. 1-12.
Notice of Allowance for U.S. Appl. No. 14/060,966 mailed Nov. 19, 2014, 11 pages.
Final Office Action for U.S. Appl. No. 13/795,888 mailed Feb. 18, 2015, 26 pages.

\* cited by examiner

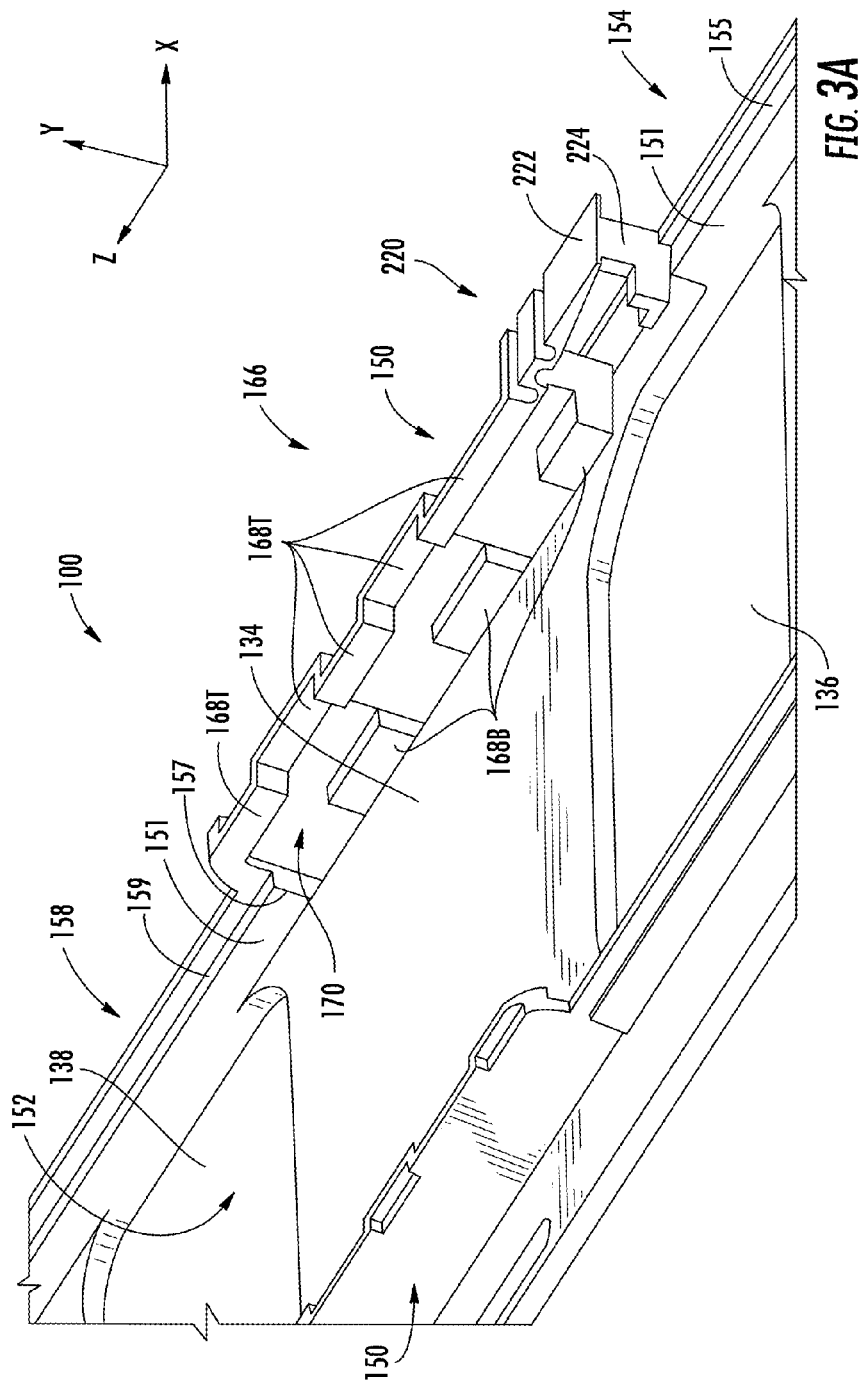

FIBER-OPTIC-MODULE TRAYS AND DRAWERS FOR FIBER-OPTIC EQUIPMENT

FIELD

The present disclosure relates to fiber-optic modules provided in fiber-optic equipment that supports fiber-optic connections, and in particular to trays and drawers used to support the fiber-optic modules in the fiber-optic equipment.

BACKGROUND

Benefits of optical fiber include extremely wide bandwidth and low noise operation. Because of these benefits, optical fiber is increasingly being used for a variety of applications, including but not limited to broadband voice, video, and data transmission. Fiber-optic networks employing optical fiber are being developed and used to deliver voice, video, and data transmissions to subscribers over both private and public networks. These fiber-optic networks often include connection points linking optical fibers to provide "live fiber" from one connection point to another connection point. In this regard, fiber-optic equipment is located in data distribution centers or central offices to support interconnections. To support these interconnections, fiber-optic equipment is located in data distribution centers or central offices.

The fiber-optic equipment is customized based on the needs of the application. The fiber-optic equipment is typically included in housings that are mounted in equipment racks to optimize use of space. One example of such fiber-optic equipment is a fiber-optic module. A fiber-optic module is designed to provide cable-to-cable fiber-optic connections and to manage the polarity of fiber-optic cable connections.

A fiber-optic module is typically mounted in a tray that fits within a chassis or housing (called an interconnect unit or ICU). The tray is used to form a drawer within the housing, which in turn is mounted in an equipment rack or cabinet. Examples of such a tray, drawer and equipment rack are disclosed in U.S. Patent Application Publication No. 2010/0296790. A technician establishes fiber-optic connections to fiber-optic equipment mounted in the equipment rack by pulling out the drawer and pushing it back into the housing when the connections are completed.

Present-day trays and drawers are made of a fairly large number of parts, which makes them relatively complex and expensive. Further, the trays and drawers would benefit from configurations that better facilitate the insertion and alignment of the fiber-optic modules, as well as technician access to the modules so that the fiber-optic connections (e.g., jumper connections and trunk connections) can be more quickly made.

SUMMARY

An aspect of the disclosure is a unitary tray for operably supporting a fiber-optic module. The tray includes a base and guide rails that define a central channel sized to accommodate the fiber-optic module. The fiber-optic module can be slid into a central module position from the back or from the front of the tray, and then locked in the central module position. Unitary side guides with slotted channels can be used to form a drawer that holds one or more of the trays. The edges of the trays slidingly engage the slotted channels of opposing side guides. Flexures on the tray edges can be used to engage respective slots in the side guide channels so that the tray can have different tray positions (e.g., front, center and back) relative to the side guides. The drawers can be used to form fiber-optic equipment such as an interconnection unit that supports the modules and that allows for making multiple optical fiber interconnections. The tray as well as the side guides can be formed by a molding process, which greatly simplifies the fabrication of the trays and side guides.

Another aspect of the disclosure is a unitary tray for operably supporting a fiber-optic module that has a central axis and alignment rails. The tray has a base having front and back ends and opposite edges. The tray also includes parallel guide rails adjacent the edges that define a central open channel sized to accommodate the fiber-optic module. The tray further includes front and back insertion guides respectively formed in the parallel guide rails and configured to receive, support and align the fiber-optic module within the central open channel. The tray additionally has central guiding features formed on opposing inside surfaces of the parallel guide rails between the front and back insertion guides. The central guiding features are configured to receive the fiber-optic module and guide the fiber-optic module to a central module position within the tray. The tray has its unitary structure by virtue of being formed by molding, i.e., the tray is a molded structure.

Another aspect of the disclosure is a drawer for fiber-optic equipment that includes the tray as described above, and first and second opposing unitary side guides configured to slidingly engage the edges of the tray. In an example, the sides guides are configured so that the tray can be reside in a front tray position, a central tray position or a back tray position relative to the side guides. The tray can be locked in any of these positions and then unlocked to move the tray to another one of the positions.

Another aspect of the disclosure is a tray for operably supporting a fiber-optic module that has a central axis and alignment rails. The tray has a flat and generally rectangular base having front and back ends, a top side, and opposite edges. A pair of substantially parallel guide rails extending upwardly from the base and reside inboard of the edges. The guide rails have front and back ends and inside surfaces that define, along with a central portion of the base, a central open channel having a central axis and sized to accommodate the fiber-optic module. Front and back insertion guides are respectively formed in the inside surfaces of the guide rails adjacent the front and back ends and are configured to receive and support the fiber-optic module from the top side. The fiber-optic module alignment is supported so that the central axis of the alignment module is substantially aligned with the central axis of the central open channel. Central guiding features are formed on the inside surfaces of the guide rails between the front and back insertion guides. The central guiding features are configured to receive the fiber-optic module on the alignment rails from the top side and guide the fiber-optic module to a central position within the tray. The tray is formed as a unitary structure. In an example, the unitary structure is formed using a molding process using a single material.

Another aspect of the disclosure is a tray for operably supporting a fiber-optic module having alignment rails. The tray includes a flat, rectangular base having front and back ends and opposite edges. Parallel guide rails reside adjacent the edges and define, along with a portion of the base, a central open channel sized to accommodate the fiber-optic module. Front and back insertion guides are respectively formed in the inside surfaces of the guide rails adjacent the front and back ends and are configured to receive and support the fiber-optic module alignment rails and substantially align the central axis of the alignment module with the central axis of the central open channel. Slots are formed on opposing inside surfaces of the parallel guide rails between the front and back insertion guides. The slots run in the axial direction and are configured to receive the alignment rails of the fiber-optic module and guide the fiber-optic module to a central module position within the tray.

Another aspect of the disclosure is a drawer for fiber-optic equipment that utilizes the tray described above and that further includes first and second opposing unitary side guides. Each side guide has at least one channel configured to receive and slidingly engage the tongues of the tray and operably engage the respective flexures to releasably lock the tray a plurality of different tray positions relative to the side guides.

Additional features and advantages will be set forth in the Detailed Description which follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which:

FIG. 3A is a close-up view of the center portion of the inside of one of the guide rails showing an example guiding feature as well other latching features;

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

The entire disclosure of any publication or patent document mentioned herein is incorporated by reference.

Cartesian coordinates are shown in some of the Figures for the sake of reference and are not intended to be limiting as to direction or orientation.

Fiber-Optic Module

Figure 1A:
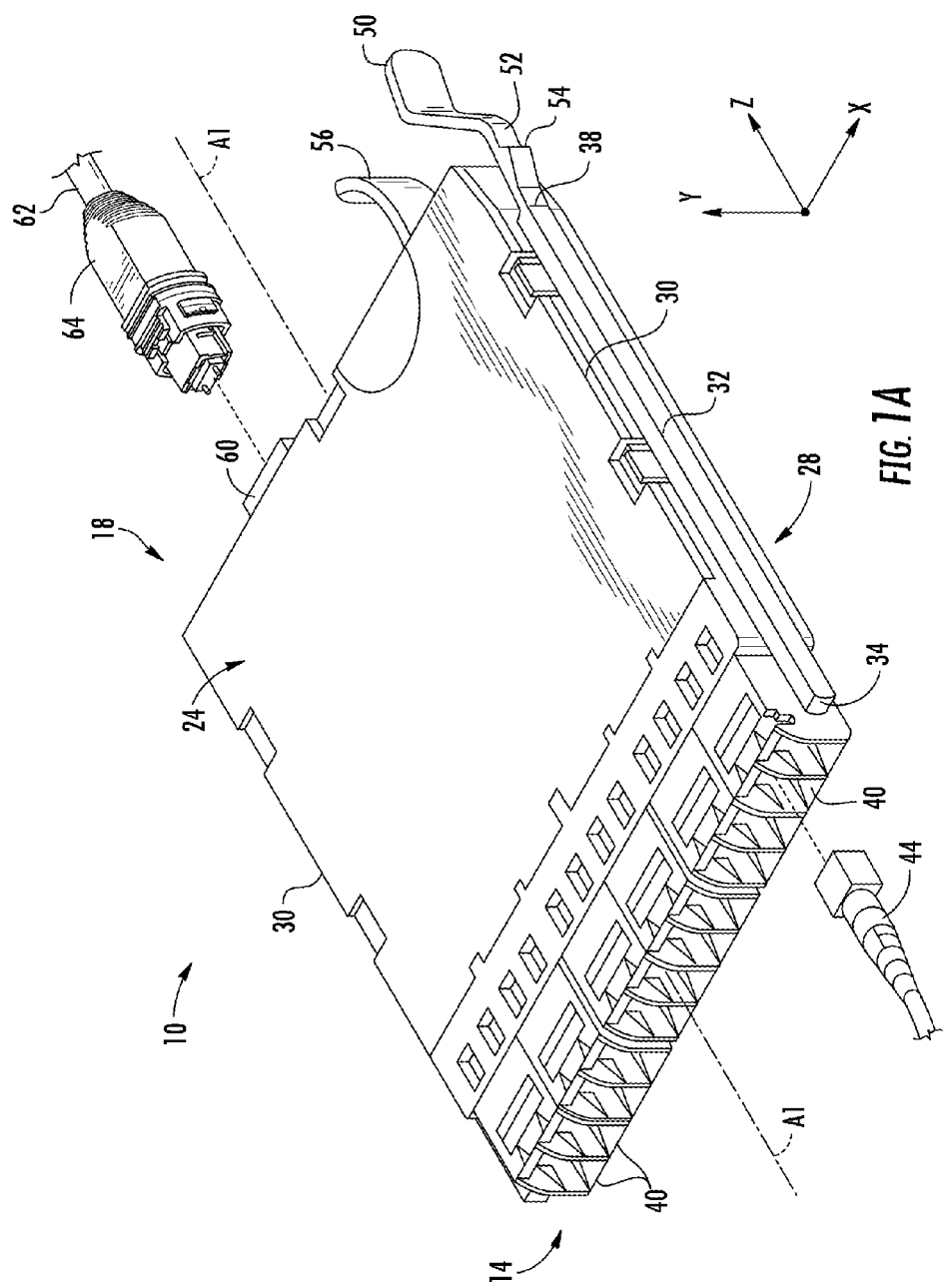
FIG. 1A is a front elevated view of an example fiber-optic module.
Figure 1B:
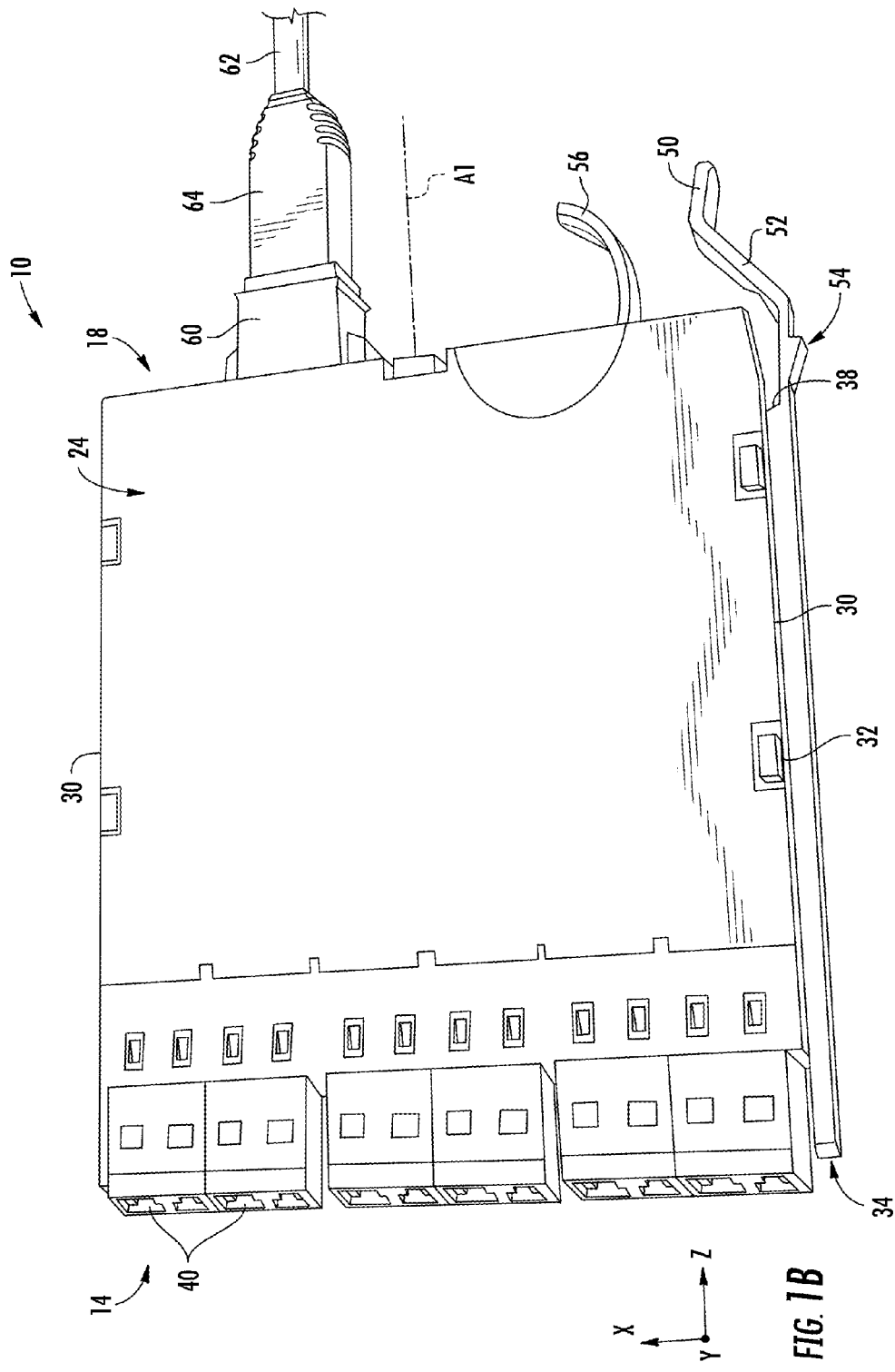
FIG. 1B is a top-down view of the fiber-optic module.

FIG. 1A is an elevated view of an example fiber-optic module ("module") 10 for use with a tray 100, while FIG. 1B is a top-down view. An example module 10 is disclosed in U.S. Pat. No. 6,758,600. The module 10 is generally rectangular and has a central axis A1. The module 10 includes a front end 14, a back end 18, generally flat top and bottom sides 24 and 28, and edges 30. The edges 30 each include an alignment rail 32 having front and back ends 34 and 38. The alignment rails 32 run generally in the z-direction.

The front end 14 includes a number of adapters 40 where jumper cables ("jumpers") 44 can be connected. The adapters 40 are shown by way of example as being configured to accept LC fiber-optic connectors. However, adapters 40 can be configured for any fiber-optic connection type desired.

A lever 50 with an outside edge 52 is operably connected to back end 38 of one of alignment rails 32. The lever 50 includes a latch 54 on its outside edge 52. To facilitate moving lever 50 inward toward module 10, a finger hook 56 is provided adjacent the lever at module back end 18 so that a technician can use two fingers to squeeze the lever toward the finger hook.

The module 10 also includes at back end 18 an adapter 60 configured to connect to multiple optical fibers. An example adapter 60 is a multi-fiber adapter such as an MTP fiber-optic adapter configured to establish connections to multiple optical fibers (e.g., twelve (12) optical fibers) of an optical fiber cable 62 having a multi-fiber connector 64, such as an MTP connector. The module 10 may be configured to manage the polarity between the front-side adapters 40 and the back-side adapter 60.

Tray

Figure 2A:
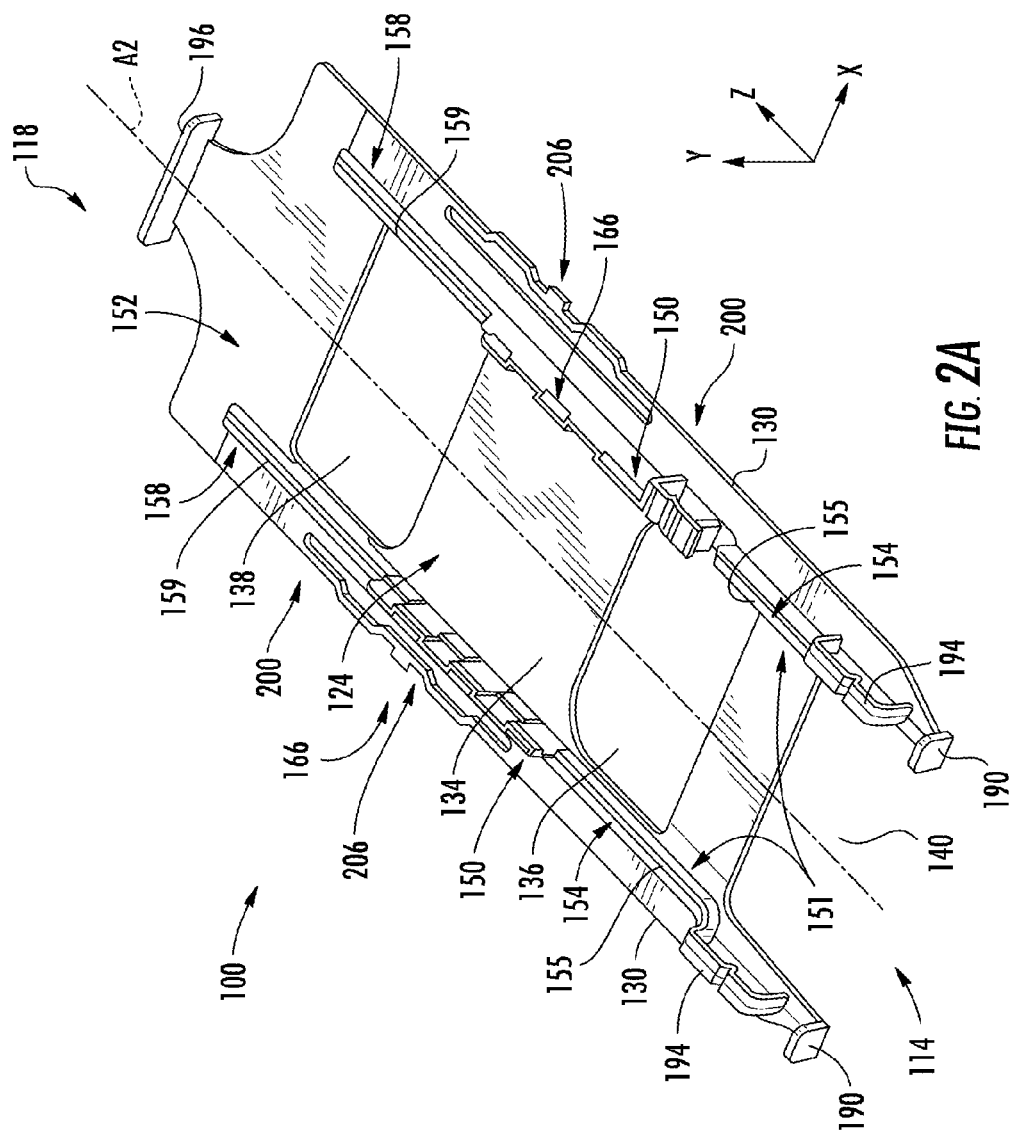
FIG. 2A is a top elevated view of an example embodiment of a tray according to the present disclosure.
Figure 2B:
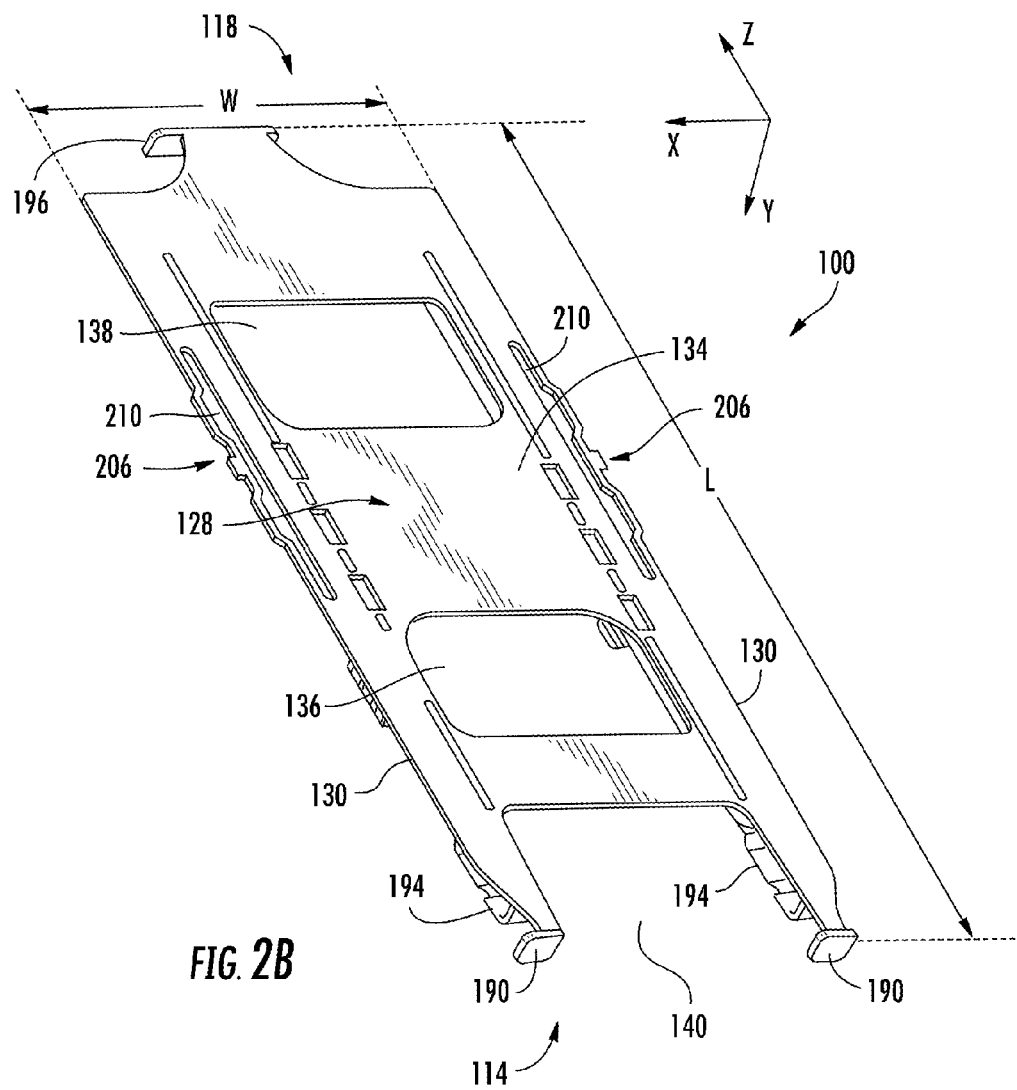
FIG. 2B is a bottom elevated view of the tray of FIG. 2A.

FIG. 2A is a front elevated view of an exemplary embodiment of tray 100 according to the disclosure, while FIG. 2B is a bottom elevated view of the tray. The tray 100 is generally rectangular in shape and includes a front end 114, a back end 118, a top side 124, a bottom side 128, and opposite edges 130. The tray 100 also includes a generally flat rectangular base 134. The base 134 includes frontward and backward (i.e., rearward) access openings 136 and 138, as well as a U-shaped recess 140 at front end 114. In an example, base 134 is relatively thin, i.e., has a thickness TH in the range from about 0.060 inches to about 0.125 inches.

The tray 100 is configured to accommodate one fiber-optic module 10 in either a front module position FMP, a center module position CMP or a back module position BMP, as shown and discussed in greater detail below.

The tray 100 further includes a pair of generally parallel guide rails 150 that run longitudinally and that arise from the base. Guide rails 150 reside adjacent and inboard from respective edges 130. The guide rails 150 have respective inside surfaces 151 that, along with a central portion of base 134, define a central open channel 152 having a central axis A2.

The guide rails 150 include opposing front insertion guides 154 formed on inside surfaces 151 adjacent front end 114. The guide rails 150 also include opposing back insertion guides 158 formed on inside surfaces 151 adjacent back end 118. In an example, front and back insertion guides 154 and 158 are defined by respective front ledges 155 and back ledges 159 formed in the respective inner surfaces 151 of guide rails 150. The ledges 155 and 159 are configured to support alignment rails 32 on module 10.

The front and back insertion guides 154 and 158 on guide rails 150 are separated in the axial direction by a central guiding feature 166. FIG. 3A is a close-up view of the center portion of inside surface 151 of one of guide rails 150 and illustrates an example central guiding feature 166 in the form of top and bottom corrugations 168T and 168B. The top and bottom corrugations 168T and 168B are spaced apart in the vertical direction (i.e., the Y-direction) and are offset relative to each other in the horizontal direction (i.e., the Z-direction). The top and bottom corrugations 168T and 168B define a horizontal guide slot 170. The offset configuration of top and bottom corrugations 168T and 168B is used to accommodate features in a mold used when forming tray 100 by a molding process. In another example embodiment, guide slot 170 is continuous. The back insertion guides 158 each include a vertical edge 157 adjacent central guiding feature 166 that is configured to engage latch 54 of module 10 as discussed below.

With reference again to FIG. 2A, guide rails 150 each include at front end 114 front pull tabs 190 and jumper guides 194. Jumper guides 194 are configured to guide jumper cables 44, as discussed below in connection with FIGS. 7A and 7B. A centrally located back pull tap 196 is attached to base 134 at back end 118.

Figure 3B:
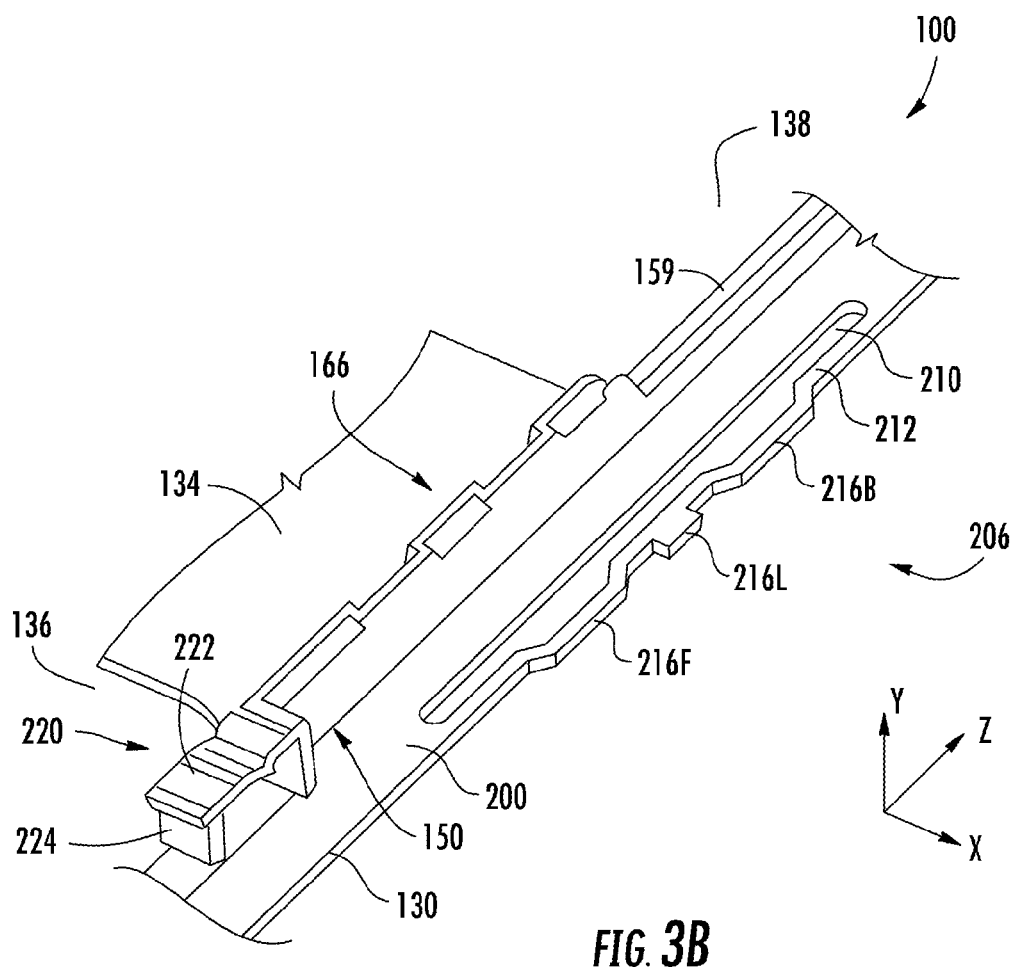
FIG. 3B is a close-up view of the center portion of the outside of one of the guide rails showing an example tray positioning feature.

Guide rails 150 and edges 130 define tongues 200 formed by the portion of base 134 adjacent each of the edges. The tongues 200 each include a positioning feature 206. FIG. 3B is a close-up view of the center portion of outside of one of guide rails 150 showing an example tray positioning feature 206. In the example of FIG. 3B, positioning feature 206 is configured as a flexure by providing a relatively thin and elongated aperture 210 that defines a flexible wall 212 at edge 130. In an example embodiment, flexible wall 212 includes a front-position detent 216F, a back-position detent 216B and a locking detent 216L that resides about midway between the front-position and back-position detents. The flexibility of a flexure type of positioning feature 206 allows for the positioning feature to be flexed to disengage the positioning feature (including the detents formed thereon) from its complementary locking feature, as discussed below.

With reference to FIG. 3A and FIG. 3B, tray 100 also includes a module locking feature 220 along one of guide rails 150 in between front end guide 154 and central guiding feature 166. The module locking feature 220 is configured to lock module 10 in the center position of tray 100 as described below. The module locking feature 220 includes a lever 222 flexibly connected at its backward end to an end portion of central guiding feature 166 and connected at its frontward end to a downwardly depending latching feature 224 that engages the front end 34 of module alignment rail 32 to lock module 10 in a center position of tray 100, as described below.

The tray 100 has a length L and a width W, which in an example are about 11 inches and 4.5 inches, respectively. Other sizes for tray 100 are possible, with the size being largely dependent upon on the size of the particular modules 10 being supported by the tray.

In an example embodiment, tray 100 is formed as a unitary structure. In an example, the unitary embodiment of tray 100 is formed by molding a single material. An example material for tray 100 is plastic.

Module Positions in Tray

Figure 4A:
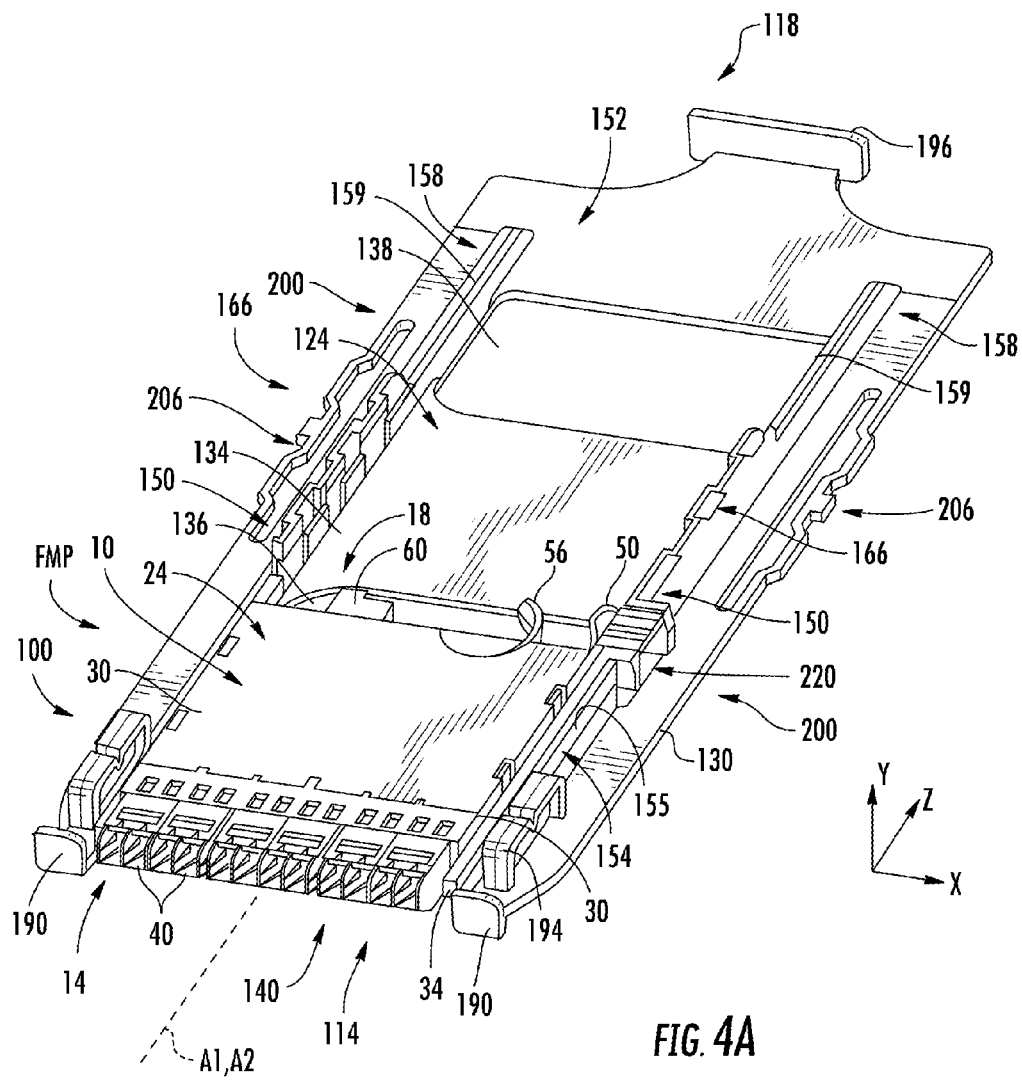
FIG. 4A is a front elevated view of the tray of FIG. 1 shown with the module of FIG. 3 disposed in a front position in the tray.
Figure 4B:
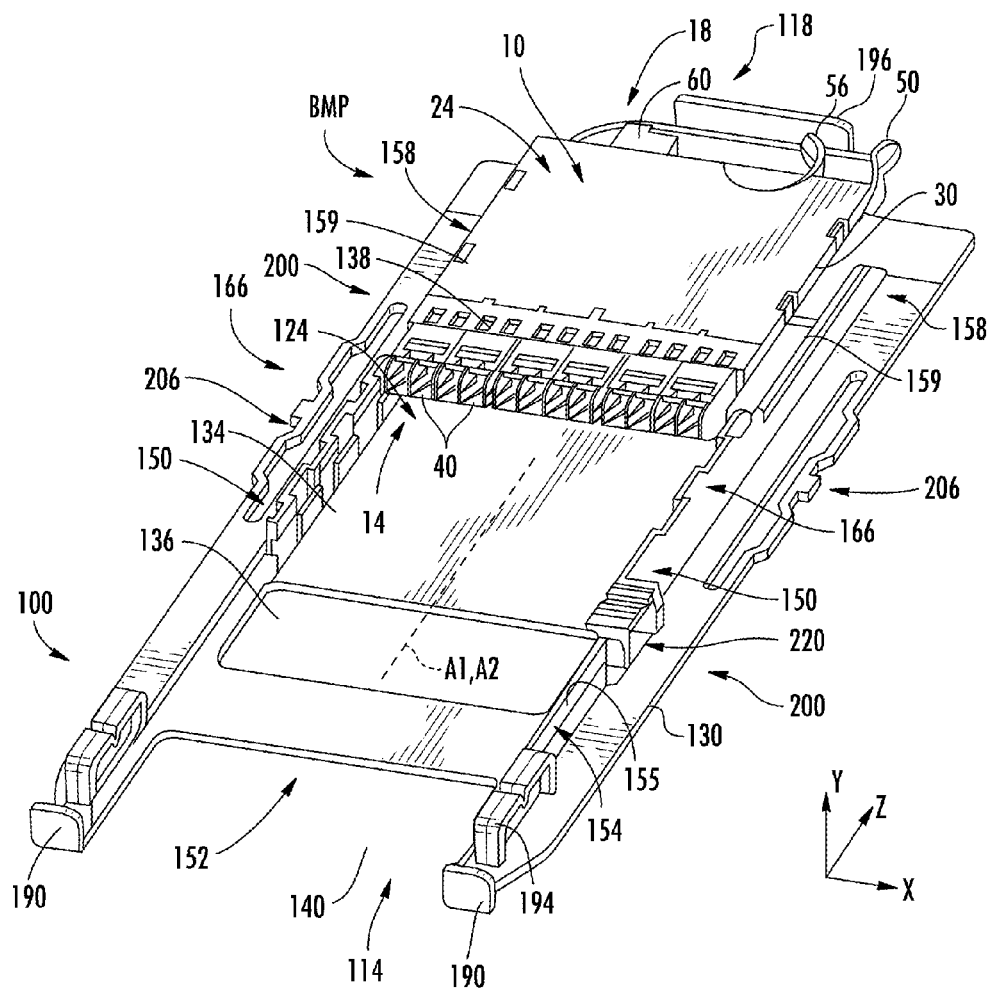
FIG. 4B is similar to FIG. 4A, but with the fiber-optic module disposed in a back position in the tray.
Figure 4C:
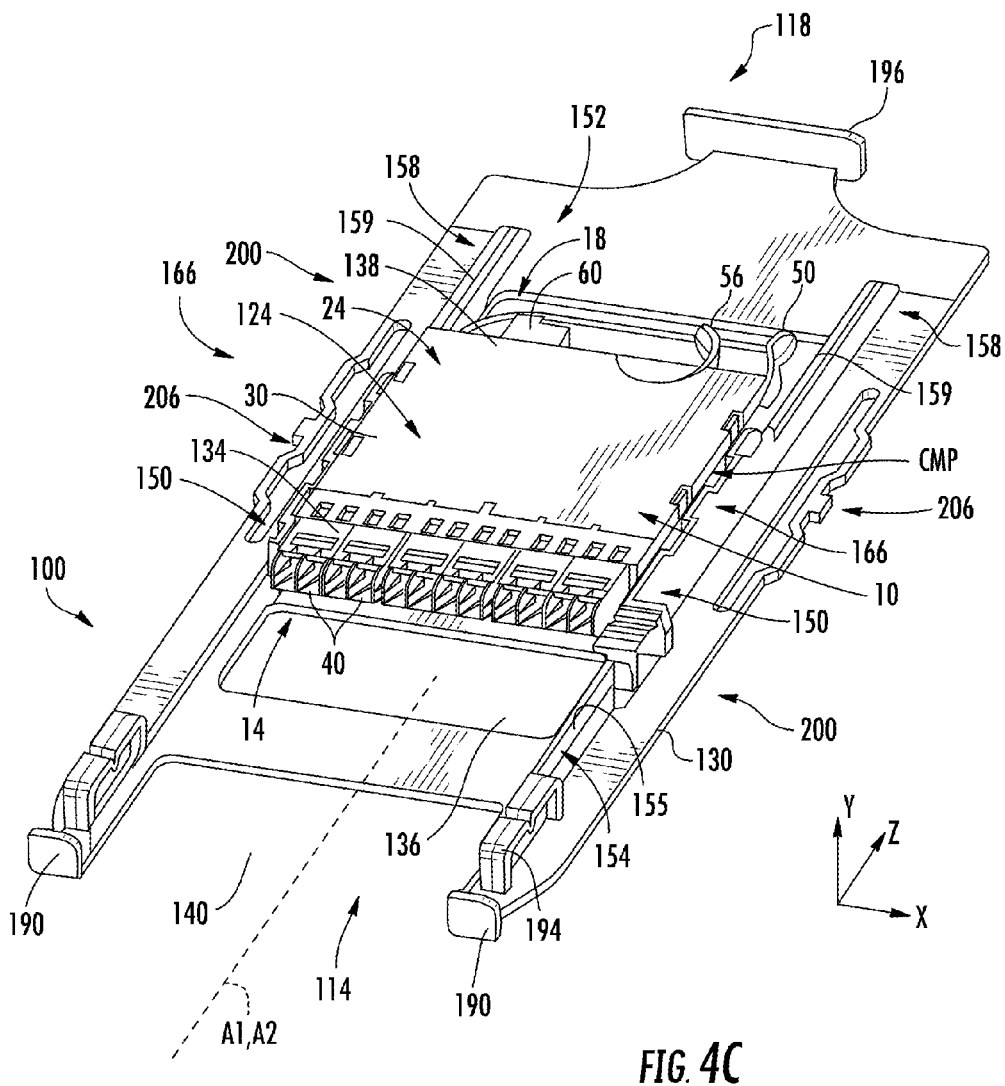
FIG. 4C is similar to FIGS. 4A and 4B, but with the fiber-optic module locked in a center position in the tray.

FIGS. 4A through 4C are similar to FIG. 2A, except that they respectively show module 10 disposed in a front module position FMP, a back module position BMP and a center module position CMP. The front and back module positions FMP and BMP are temporary positions used to insert and lock module 10 in the center module position CMP.

With reference to FIG. 4A, module 10 can be disposed in tray 100 at front module position FMP as shown in FIG. 4A by aligning the module with tray front end 114 so that module central axis A1 and tray central axis A2 are substantially aligned in the Y-Z plane, with the module just above the tray at the tray front end. The module 10 can then be lowered onto (i.e., dropped into) tray 100 at front end 114 to initiate engagement of alignment rails 32 with the front end guides 154, with the alignment rails resting on ledges 155. The module 10 can then be slid into the center module position CMP as shown in FIG. 4C by urging the module in the +Z direction. At this point, alignment rails 32 engage central guide 166, i.e., they travel within guide slot 170 until latch 54 of lever 50 engages edge 157 of back insertion guides 158 to prevent further backward motion. The latch 54 is inwardly biased such that module 10 can be installed in tray 100 from either front end 114 or back end 118.

At this point, locking feature 220, which is normally in the latch position, has secured module 10 in the center module position. To release module 10 locking feature 220 must be depressed and the module slid forward. To disengage (unlock) module 10, a technician can insert their fingers through back opening 138 to access lever 50 and finger hook 56 and disengage latch 54. The technician can also disengage locking feature 220 by pushing down lever 222 of the locking feature. This allows module 10 to slide within guide slots 170 either axially forward or backward within tray 100. When moving module 10 to front module position FMP or back module position BMP, alignment rails 32 of the module transition from being guided by guide slots 170 to resting on front or back ledges 155 or 159. This allows module 10 to be easily lifted up and out of tray 100 when in front module position FMP or back module position BMP.

The tray 100 is configured so that module 10 can be placed directly in back module position BMP in essentially the same manner as it is placed in front module position FMP (including with module front end 14 facing tray front end 114). The module 10 is then moved in the −Z direction into center module position CMP. With reference to FIG. 4B, this is accomplished by disposing module 10 so that its axis A1 and tray axis A2 are substantially aligned in the Y-Z plane with the module just above the tray at the tray back end 118. The module 10 is then lowered (dropped) into place so that alignment rails 32 of the module rest on ledges 159 of back insertion guides 158. The module 10 is then urged in the −Z direction so that alignment rails 32 engage central guide 166, i.e., they travel within guide slot 170 until latch 54 of lever 50 engages edge 157 of back insertion guides 158 to prevent further backward motion. The module 10 is then locked into central module position CMP using locking feature 220 as described above.

Drawers with Movable Trays

Figure 5A:
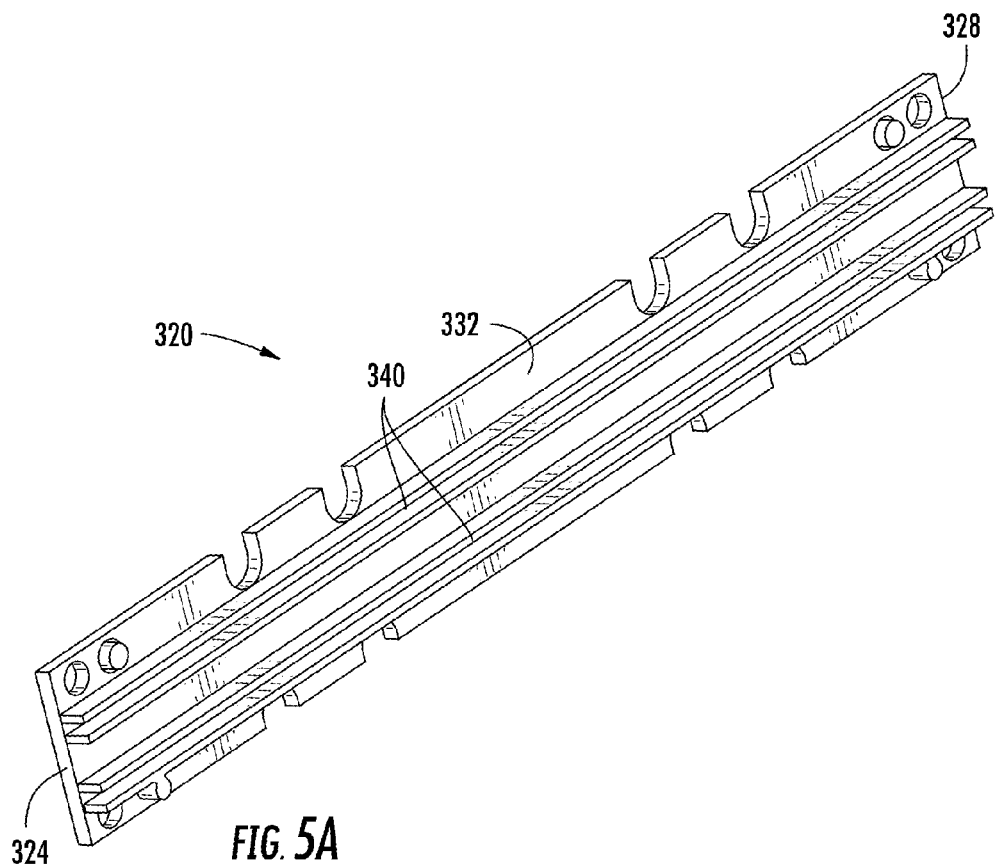
FIG. 5A and FIG. 5B are two elevated views from different sides of an example side guide used to form a drawer that can slidingly support one or more trays in multiple positions.
Figure 5B:
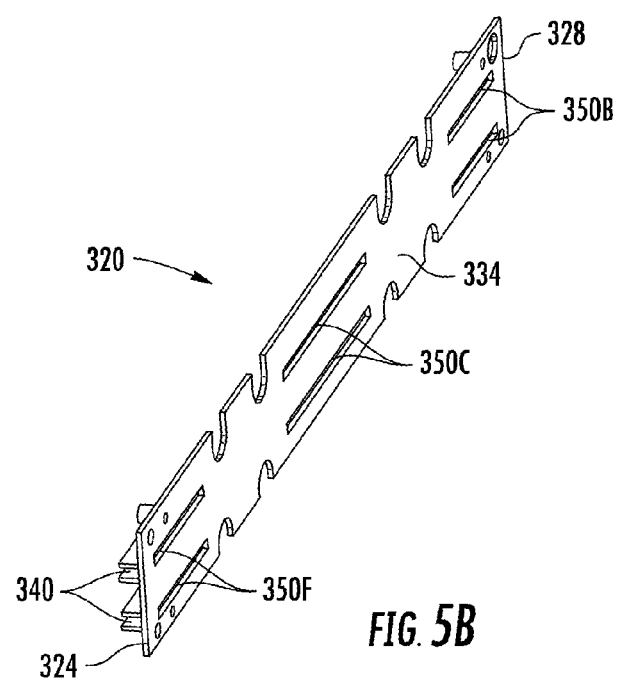

An aspect of the disclosure is a drawer that operably supports one or more trays 100 as described above. FIG. 5A and FIG. 5B are two elevated views of different sides of an example side guide 320, wherein two such side guides are used to form a drawer 400, as shown in the elevated views of FIGS. 6A through 6C. The drawer 400 is configured so that each tray 100 supported thereby can be placed in a front tray position FTP (FIG. 6A), a center tray position CTP (FIG. 6C) and a back tray position BTP (FIG. 6B) and releasably locked in these positions.

Figure 6A:
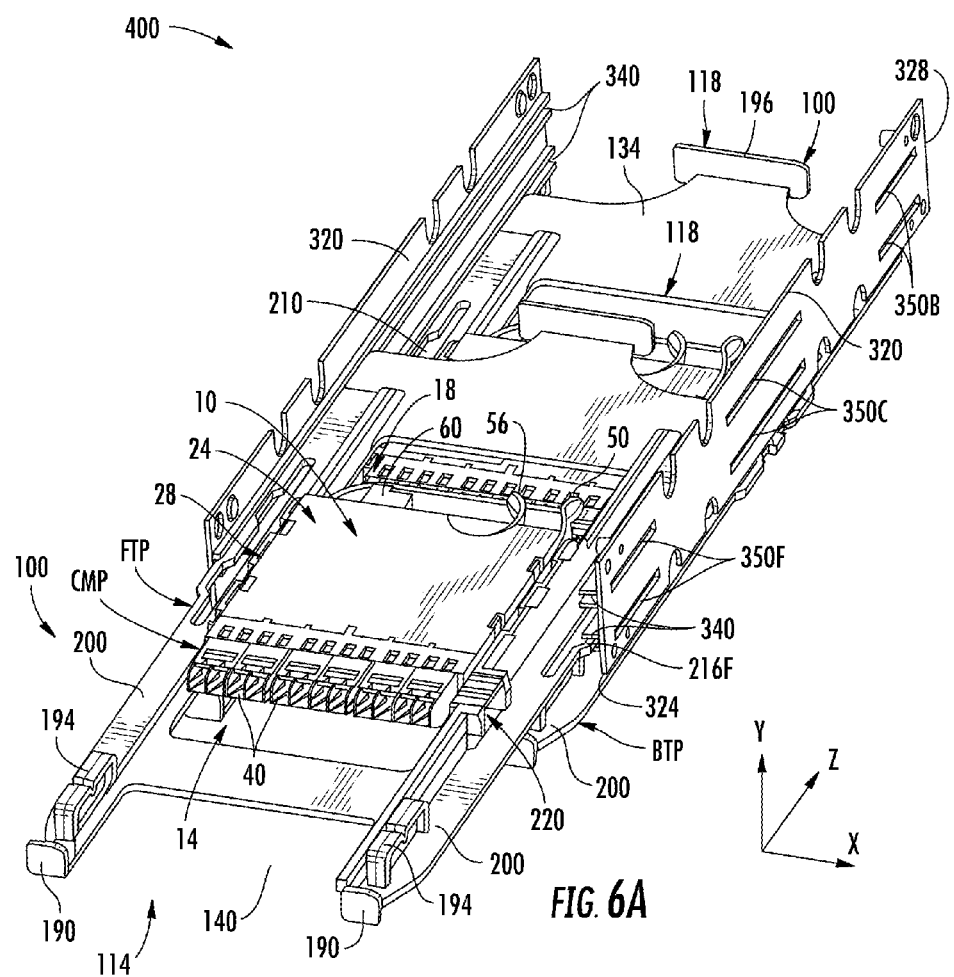
FIG. 6A through 6C are front elevated views of example embodiments of a drawer, showing the two trays operably supporting respective modules in the center position, and illustrating the front, back and center positions of the trays within the drawers.
Figure 6B:
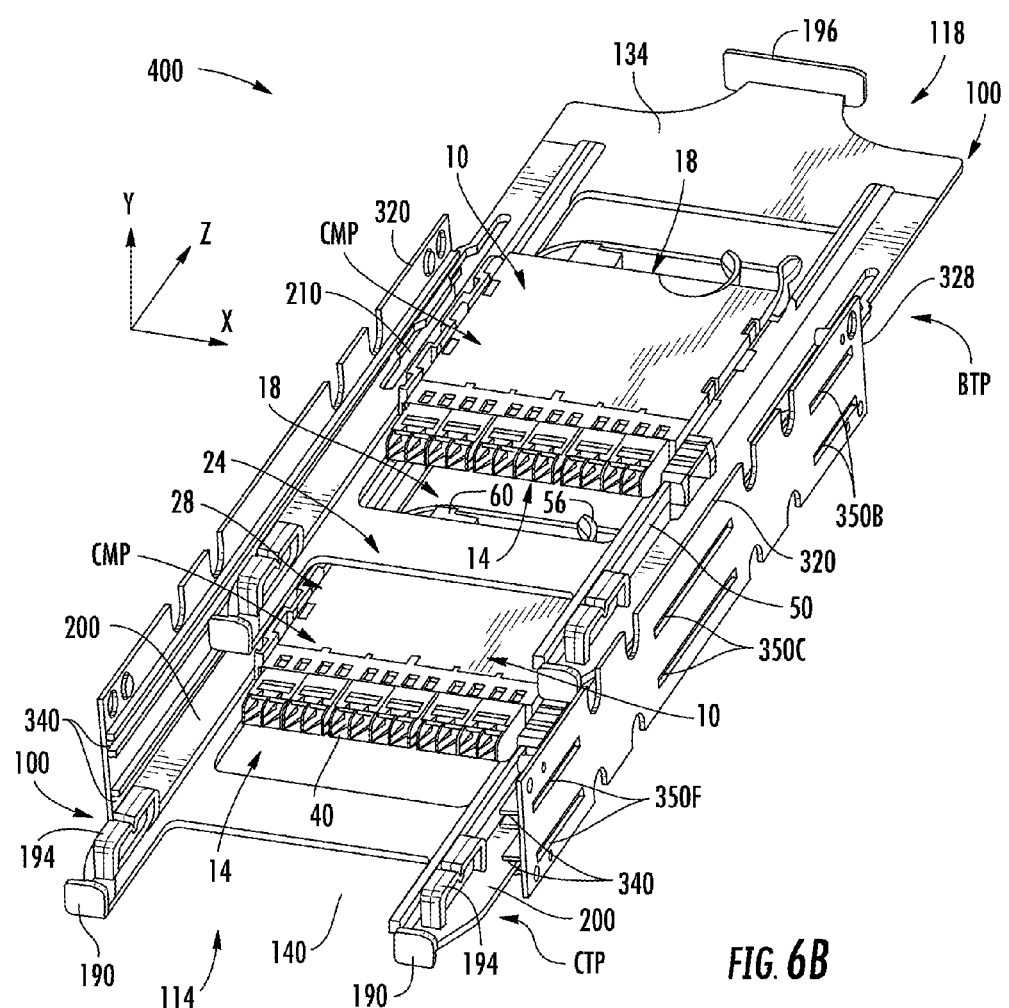
Figure 6C:
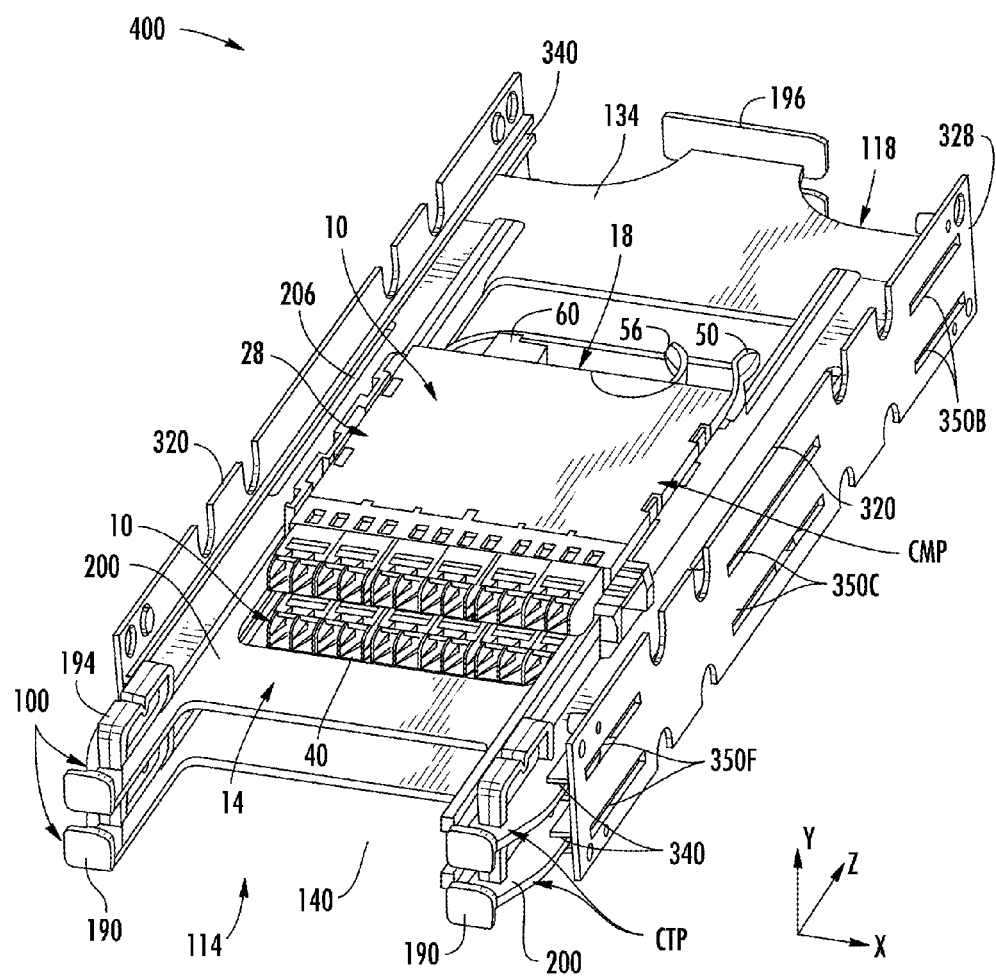

The side guide 320 includes a front end 324, a back end 328, an inner side 332 and an outer side 334. The side guide 320 includes one or more open channels 340, with each channel sized to accommodate and support tongues 200 of tray 100. Two channels 340 are shown by way of example and are used to form example drawer 400 that supports two trays 100, as shown in FIGS. 6A through 6C. Thus, drawer 400 is formed by arranging two side guides 320 with their inner sides 332 facing each other and spaced apart so that one or more trays 100 can fit between the side guides with tongues 200 sliding in the corresponding side-guide channels 340.

As best seen in FIG. 5B, side guide 320 includes, in each channel 340, front, center and back slots 350F, 350C and 350B, with each slot configured to engage with positioning feature 206 formed on tongue 200, depending on the position of tray 100 relative to the side guide. For example, in FIG. 6A, the top tray 100 is in front tray position FTP relative to side guides 320, with tray positioning features 206 engaging front slots 350F. Likewise, in FIG. 6C, the bottom tray 100 is in center position CTP relative to side guides 320, with tray positioning features 206 engaging center slots 350C.

FIG. 6A shows drawer 400 with top tray 100 in front tray position FTP relative to side guides 220, with the tray positioning features 206 engaging front slots 350F. FIG. 6B shows the top tray 100 in back tray position BTP relative to side guides 220, with the tray positioning features 206 engaging back slots 350B. FIG. 6C shows both the top and bottom trays 100 in central tray position CTP relative to side guides 220, with their respective tray positioning features 206 engaging respective central slots 350C.

In an example embodiment, each positioning feature 206 is configured as a flexure having the aforementioned front and back detents 216F and 216B and locking detent 216L. In such an example embodiment, in front tray position FTP of tray 100 within drawer 400, front detent 216F engages front end 324 of side guide 320 and locking detent 216L and back detent 216B reside within front slot 350F. This allows the positioning features 206 to click into place on the respective side guides 320 and to hold (lock) tray 100 in front tray position FTP. The tray 100 can be disengaged from being locked in front tray position FTP by a user applying minimal pressure to flex the positioning feature 206 to release it from front slot 350F.

When tray 100 is in center tray position CTP, the entire positioning feature 206 fits within center slot 350C and is released by urging the tray forward or backward to inwardly flex the positioning feature so that it disengages from the center slot. The back tray position BTP of tray 100 has essentially the same locking configuration as front tray position FTP, but with back detents 350B engaged with back ends 328 of side guides 320.

In an example, side guide 320 is a unitary structure. Further in the example, side guide 320 is formed by molding. An example material for side guide 320 is plastic.

Figure 7A:
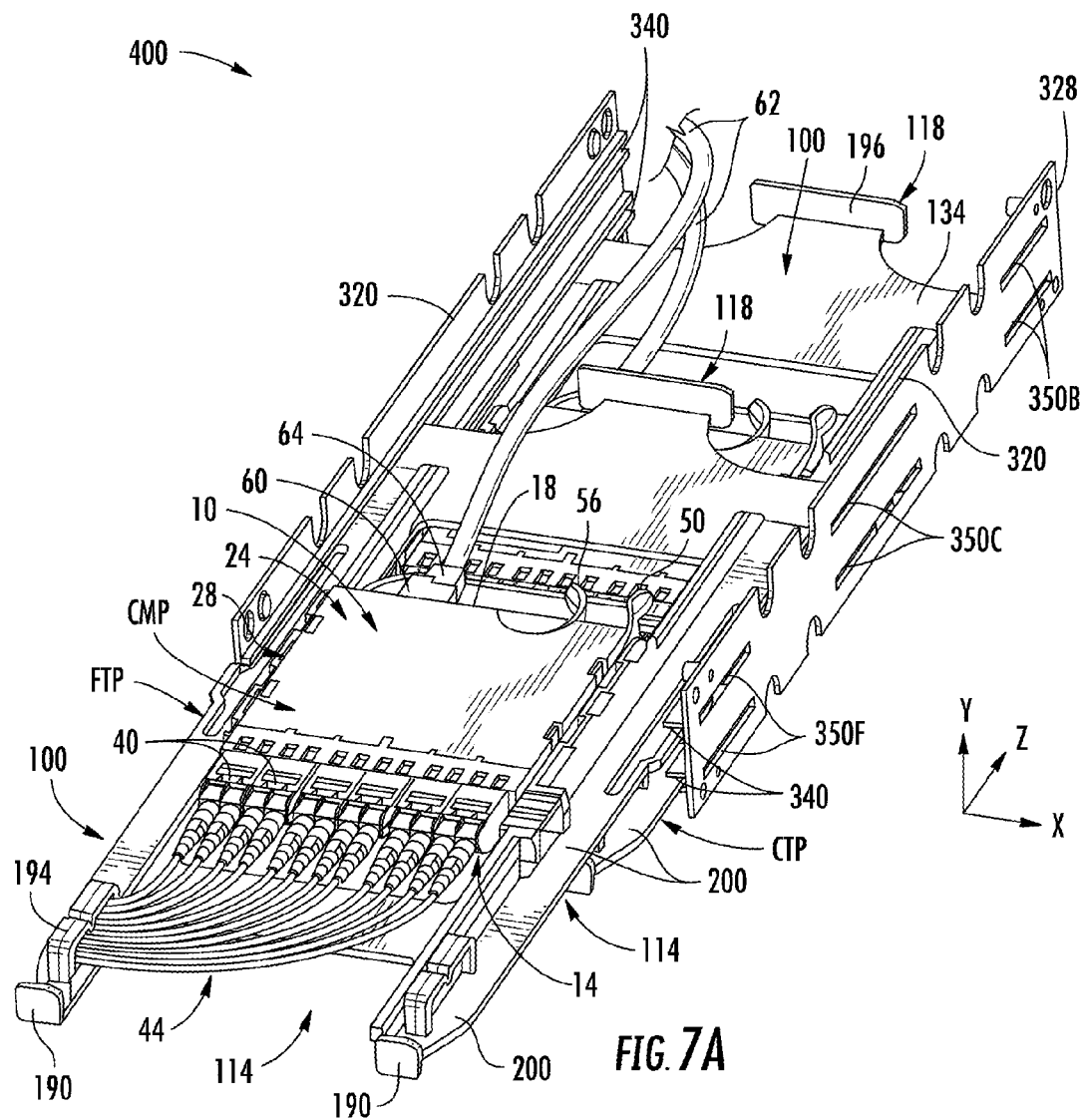
FIG. 7A is similar to FIG. 6A and additionally shows jumpers and a fiber-optic cable operably connected to the fiber-optic modules.
Figure 7B:
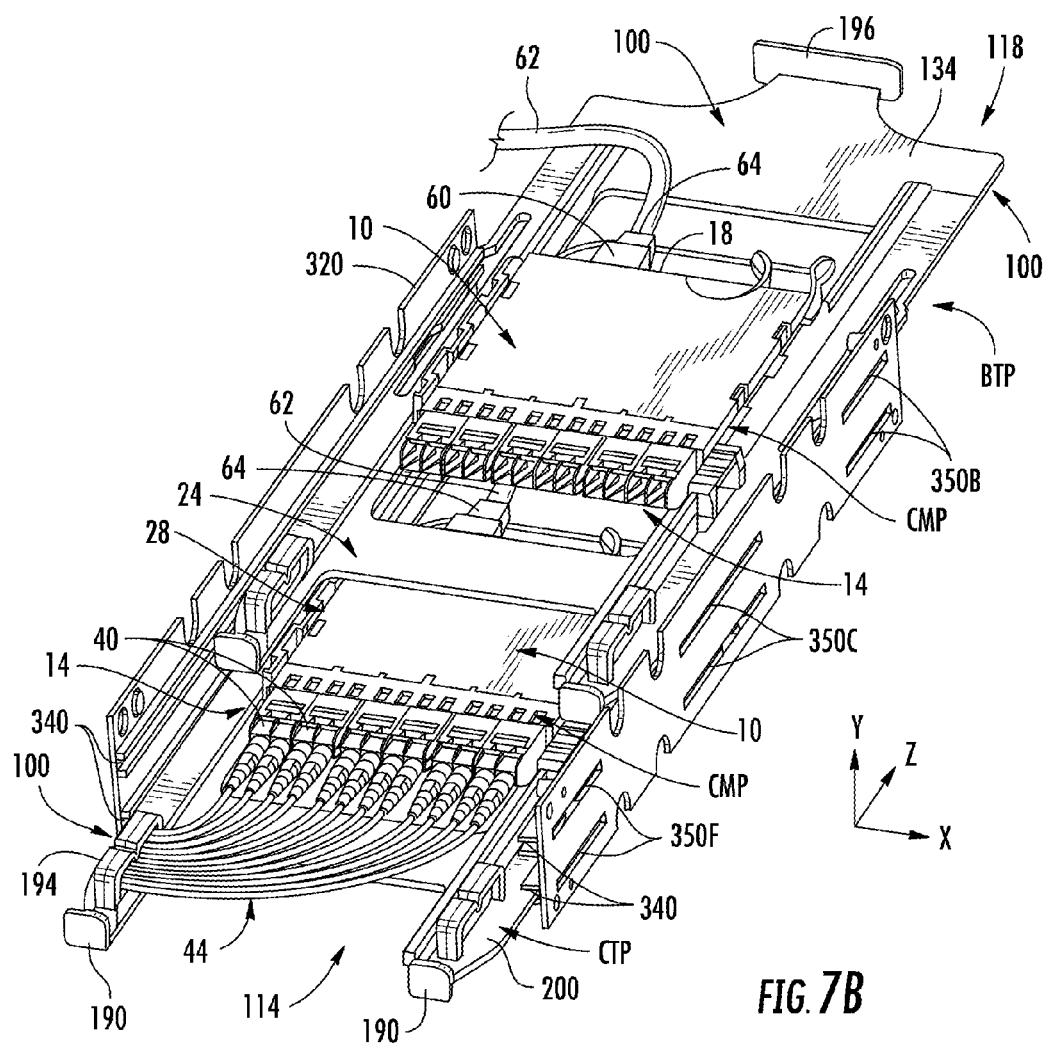
FIG. 7B is similar to FIG. 7A but with the trays in different tray positions within the drawer.

FIG. 7A is similar to FIG. 6A and shows a number of jumper cables 44 attached to adapters 40 at front end 14 of module 10, with the top module in center module position CMP in tray 10, and the top tray in front tray position FTP. FIG. 7B is similar to FIG. 6B, but with trays 100 in different tray positions within drawer 400. The jumper cables 44 are shown as being guided by one of jumper guides 194 and connected to corresponding adapters 40 on module 10. Likewise, two fiber-optic cables 62 with multi-fiber connectors 64 are shown as being connected to respective adapters 60 at back ends 18 of two modules 10. The two fiber-optic cables 62 are shown as entering drawer 400 at back ends 118 of trays 100, while the jumper cables 44 enter from tray front end 114.

Fiber-optic Equipment

Figure 8:
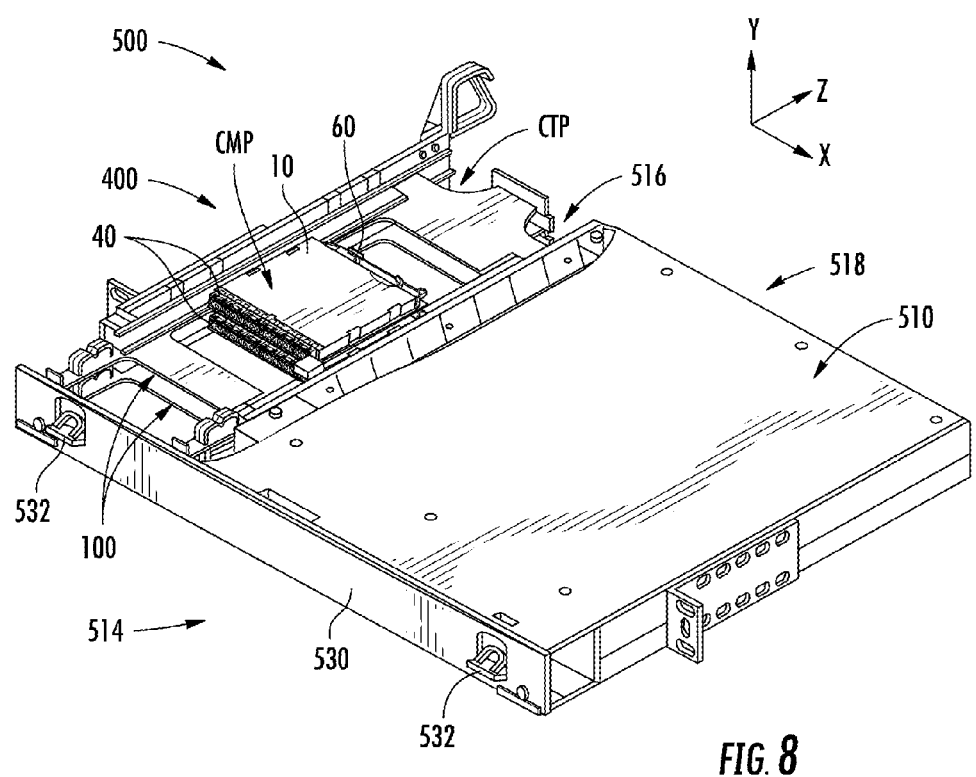
FIG. 8 is a front elevated view of example fiber-optic equipment in the form of an interconnection unit (ICU) that houses the drawers and the fiber-optic modules supported by the trays.

FIG. 8 is an elevated and partially cut-away view of fiber-optic equipment shown by way of example as an interconnection unit (ICU) assembly 500. The ICU assembly 500 includes at least one drawer 400, which is shown by way of illustration as operably supporting two modules 10, which are shown in center module position CMP in trays 100. The exemplary ICU assembly 500 may be provided at a data distribution center or central office to support cable-to-cable fiber-optic connections and to manage a plurality of fiber-optic cable connections.

The ICU assembly 500 includes a fiber-optic equipment housing 510 that has a front end 514, a back end 518, and an interior 516. The housing 510 includes at front end 514 a front door 530 that swings downward to allow access to interior 516. The housing 510 includes front-door latches 532 configured to allow front door 530 to be latched in the closed position and unlatched to open the front door and allow access to housing interior 516 and drawers 400, trays 100 and modules 10 operably supported therein. The housing 510 optionally includes a similar back door (not shown) at back end 518.

Note that trays 100 can be pulled into front tray position FTP so that the trays extend beyond housing front end 514. Further, modules 10 operably supported in respective trays 100 can be moved between front and center module positions FMP and CMP to allow for easy access, servicing, installation and removal of the modules.

The housing 510 is configured so that it can be installed in a fiber-optic equipment rack (not shown) if desired. The housing 510 is shown as being 1U-sized, with "U" equaling a standard 1.75 inches in height, but could be any other U-size desired, or any other height desired.

As discussed above, trays 100 can be moved and extended from and retracted back into their drawer 400. Any number of trays 100 can be supported in drawers 400 within housing 510. Likewise, any number of modules 10 can be supported in trays 100.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A tray for operably supporting a fiber-optic module that has a central axis and alignment rails, the tray comprising:
    a base having front and back ends, a top side and opposite edges;

parallel guide rails adjacent the edges that define a central open channel sized to accommodate the fiber-optic module;

front and back insertion guides respectively formed in the parallel guide rails and configured to receive, support and align the fiber-optic module within the central open channel;

central guiding features formed on opposing inside surfaces of the parallel guide rails between the front and back insertion guides, the central guiding features being configured to receive the fiber-optic module and guide the fiber-optic module to a central module position within the tray; and wherein the tray is formed as a unitary, molded structure from a single piece of material.

2. The tray according to claim 1, further comprising a fiber-optic module locking feature formed on one of the guide rails and configured to operably engage a portion of the fiber-optic module to lock the module in the center module position.

3. The tray according to claim 1, further comprising front and back access openings formed in the base.

4. The tray according to claim 1, wherein the front and back insertion guides are configured so that the fiber-optic module can be lowered onto either the front or back insertion guide from the front side of the base and then slid into the central module position.

5. The tray according to claim 1, further comprising flexures formed on the respective edges of the base.

6. A drawer for fiber-optic equipment, comprising:
the tray of claim 5; and
first and second opposing unitary side guides configured to slidingly engage the edges of the tray.

7. The drawer according to claim 6, wherein each of the side guides includes at least one channel, and wherein the side guides are configured so that the edges of the tray are slidingly engaged by the respective channels of the opposing side guides.

8. The drawer according to claim 7, wherein each channel includes a plurality of slots, and wherein the flexure engages one of the slots to define a corresponding plurality of tray positions relative to the side guides.

9. The drawer according to claim 7, further comprising multiple trays and a housing having an interior that contains the side guides and the multiple trays.

10. A tray for operably supporting a fiber-optic module that has a central axis and alignment rails, the tray comprising:
a flat and generally rectangular base having front and back ends, a top side, and opposite edges;
a pair of substantially parallel guide rails extending upwardly from the base and residing inboard of the edges, the guide rails having front and back ends and inside surfaces that define, along with a central portion of the base, a central open channel having a central axis and sized to accommodate the fiber-optic module;
front and back insertion guides respectively formed in the inside surfaces of the guide rails adjacent the front and back ends and configured to receive and support the fiber-optic module alignment rails and substantially align the central axis of the alignment module with the central axis of the central open channel;

central guiding features formed on the inside surfaces of the guide rails between the front and back insertion guides, the central guiding features being configured to receive the alignment rails of the fiber-optic module and guide the fiber-optic module to a central position within the tray; and wherein the tray is formed as a unitary structure from a single piece of material.

11. The tray according to claim 10, further comprising a fiber-optic-module locking feature formed on one of the guide rails between the front insertion guide and the central guiding features, the fiber-optic-module locking feature being configured to operably engage a portion of the fiber-optic module to lock the module in a center module position.

12. The tray according to claim 10, further comprising the fiber-optic module.

13. The tray according to claim 10, wherein the front and back insertion guides each include ledges upon which the alignment rails rest when the fiber-optic module is inserted into the tray from the top side at the front end or the back end of the tray, respectively.

14. The tray according to claim 10, further comprising tongues formed on the respective edges of the base, the tongues having formed therein respective flexures.

15. A drawer for fiber-optic equipment, comprising:
the tray of claim 14; and
first and second opposing unitary side guides, each having at least one channel configured to receive and slidingly engage the tongues of the tray, with each channel having front, center and rear slots configured to operably engage at least a portion of the flexure so that the tray can be locked in either a front tray position, a center tray position or a back tray position relative to the side guides and unlocked from a given one of the tray positions by flexing the flexure.

16. The drawer according to claim 15, wherein each flexure has a front-position detent and a rear-position detent, with a locking detent therebetween.

17. The drawer according to claim 16, wherein the side guides include multiple channels and the drawer supports multiple trays.

18. The drawer according to claim 17, further comprising the fiber-optic modules operably arranged one in each of the trays, with each module having a plurality of front-end adapters and a single multi-fiber back end adapter.

19. The drawer of claim 18, further comprising one or more jumpers operably connected to the corresponding one or more front-end adapters and a multi-fiber fiber-optic cable operably connected to the back-end multi-fiber connector.

20. The drawer of claim 18, further comprising a housing having an interior that operably supports the drawer to form an interconnection equipment unit.

* * * * *